United States Patent [19]

Matsuda et al.

[11] Patent Number: 5,800,073
[45] Date of Patent: *Sep. 1, 1998

[54] PRINTING APPARATUS FOR PRINTING ERRORS IN COLOR

[75] Inventors: Noriyuki Matsuda; Yoshio Shiromoto; Yasuhito Taira, all of Yokohama, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 632,155

[22] Filed: Apr. 15, 1996

[30] Foreign Application Priority Data

Jun. 27, 1995 [JP] Japan ............... 7-161210

[51] Int. Cl.$^6$ ........................................ B41J 3/46
[52] U.S. Cl. .................. 400/74; 400/120.02; 347/43
[58] Field of Search ............... 400/54, 74, 120.02, 400/124.09; 395/114, 109; 347/19, 43

[56] References Cited

U.S. PATENT DOCUMENTS

| | | | |
|---|---|---|---|
| 4,908,712 | 3/1990 | Uchiyama | 347/43 |
| 5,252,992 | 10/1993 | Fukushima | 342/43 |
| 5,297,877 | 3/1994 | Nishikawa | 400/76 |
| 5,413,419 | 5/1995 | Oami et al. | 400/74 |
| 5,508,826 | 4/1996 | Lloyd | 347/19 |
| 5,539,434 | 7/1996 | Fuse | 347/19 |
| 5,550,956 | 8/1996 | Tadokoro | 347/19 |
| 5,610,639 | 3/1997 | Takada | 347/19 |
| 5,620,264 | 4/1997 | Kagita | 400/74 |
| 5,704,021 | 12/1997 | Smith | 347/43 |

FOREIGN PATENT DOCUMENTS

| | | |
|---|---|---|
| 1-139267 | 5/1989 | Japan . |
| 4-196756 | 7/1992 | Japan . |
| 6-28130 | 2/1994 | Japan . |

Primary Examiner—Edgar S. Burr
Assistant Examiner—Steven S. Kelley
Attorney, Agent, or Firm—Armstrong, Westerman, Hattori, McLeland & Naughton

[57] ABSTRACT

A printing apparatus which enables the operator to immediately discriminate a position of a check objective paper from results of printing has a printing mechanism for printing in at least one color on predetermined papers, a control unit for controlling a printing operation of the printing mechanism, and a detecting unit for detecting an opportunity of printing and outputting the check objective paper during the printing operation of the printing mechanism. When the detecting unit detects said opportunity, the control unit controls the printing mechanism to implement a color printing on the check objective paper in order to discriminate the check objective paper from another printed output papers. The printing apparatus is applicable to a printer which is connected to an upper apparatus such as a host computer to print data fed from the upper apparatus.

34 Claims, 33 Drawing Sheets

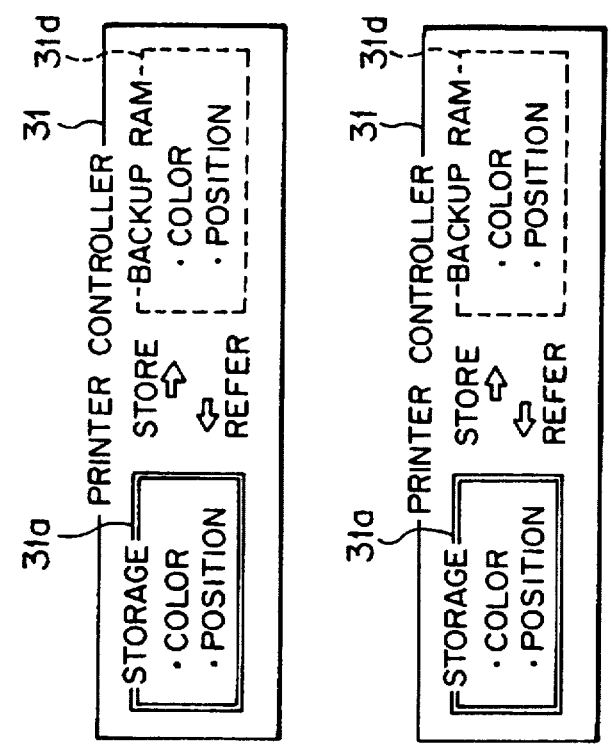
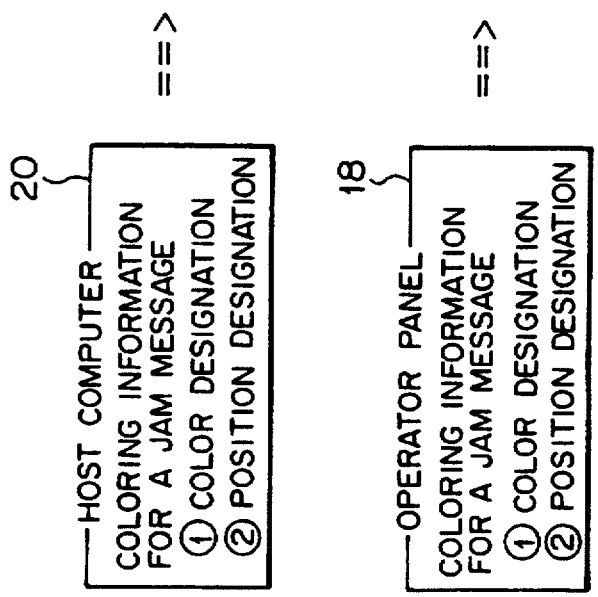

FIG. 9
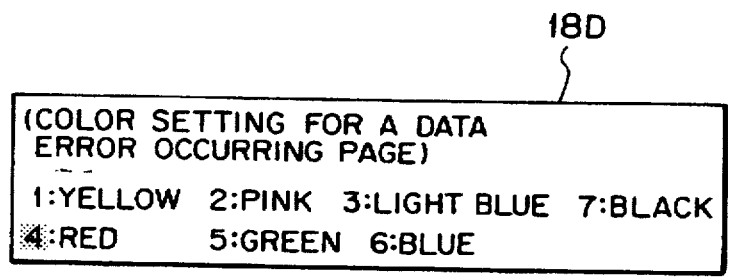
FIG. 10(a)
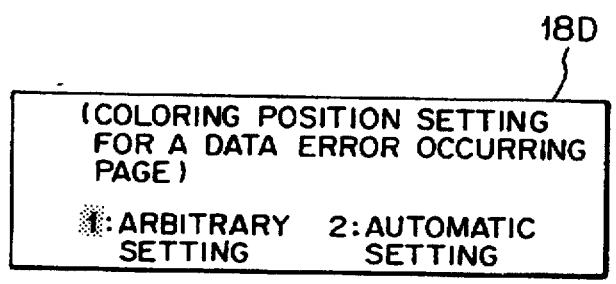
FIG. 10(b)
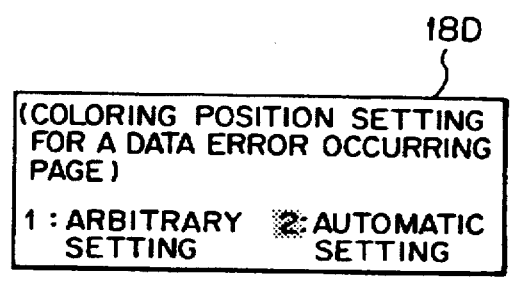
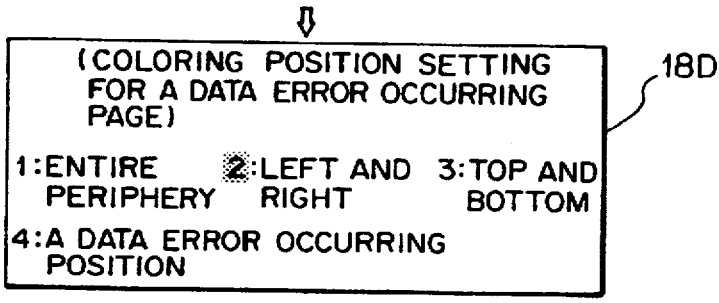

▨ : COLORED PART

40: DATA ERROR OCCURRING PAGE

COLOR DATA ERROR OCCURRING PARTS

▨ : COLORED PART

FIG. 20

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NuL | | | | SP | & | — | | | ソ | | | | | $ | 0 |
| 1 | | | | | | / | | | ア | タ | | | A | J | | 1 |
| 2 | | | | | | | | | イ | チ | ヘ | | B | K | S | 2 |
| 3 | | | | | | | | | ウ | ツ | ホ | | C | L | T | 3 |
| 4 | | | | | | | | | エ | テ | マ | | D | M | U | 4 |
| 5 | | | | | | | | | オ | ト | ミ | | E | N | V | 5 |
| 6 | | | | | | | | | カ | ナ | ム | | F | O | W | 6 |
| 7 | | | | | | | | | キ | ニ | メ | | G | P | X | 7 |
| 8 | | | | | | | | | ク | ヌ | モ | | H | Q | Y | 8 |
| 9 | | | | | | | | | ケ | ネ | ヤ | | I | R | Z | 9 |
| A | | | ⊗ | | | | | | コ | ノ | ユ | レ | | | | |
| B | | | | | | | | # | | | | | | ロ | | |
| C | | | | | | < | * | % | サ | | ヨ | ワ | | | | |
| D | | | | | | ( | ) | | シ | ハ | ラ | ン | | | | |
| E | | | | | | + | . | > | ス | ヒ | リ | | | | | |
| F | | | | | | l | — | ? | セ | フ | ル | ° | | | | |

DESIGNATE AN UNDEFINED CHARACTER CODE

NOTE : BLANK REPRESENTS AN UNDEFINED CHARACTER CODE (NO PATTERN)

INSIDE A DOT LINE IS A PRINTING ASSURING REGION

```
 0  1  2  3  4  5  6  7
┌──┬──┬─────┬───────────┐
│ 0│ 0│LINE │ CHANNEL   │
│  │  │PITCH│ NUMBER    │
└──┴──┴─────┴───────────┘
```

RESERVE — LINE PITCH — BEING ABLE TO MOVE TO A CHANNEL POSITION SET USING A "SKIP TO CHANNEL" SYSTEM COMMAND

00 : 6 LINE/INCH
01 : 8 LINE/INCH
10 : RESERVE(6 LINE/INCH, AT PRESENT)
11 : 12 LINE/INCH

////// : COLORED PART

REATED ART

PRINTING APPARATUS FOR PRINTING ERRORS IN COLOR

BACKGROUND OF THE INVENTION

1) Field of the Invention

The present invention relates to a printing apparatus connected to an upper apparatus such as a host computer to print out data fed from the upper apparatus.

2) Description of the Related Art

As shown in FIG. 39, a printing apparatus (printer) 100 is connected to a host computer 110 which is an upper apparatus to execute a job printing when receiving data from the host computer 110 to print out the data on a predetermined paper, in general.

Such printing apparatus 100 generally has a monochromatic printing engine 101, a reversing mechanism unit 102, hoppers 103 and 104, a cassette 105, a tray 106, a stacker 107 and an operator panel 108.

The monochromatic printing engine 101 is a mechanism for implementing a monochromatic printing on predetermined papers. The reversing mechanism unit 102 is a mechanism for turning over predetermined papers in order to print on both sides of the papers.

The hoppers 103 and 104 store plain papers in predetermined sizes as printing papers, respectively. The cassette 105 stores color papers fed after a certain job printing and before the next job printing to divide the job printings. The tray 106 and the stacker 107 are parts to which printed papers are discharged.

The operator panel 108 has control keys and switches used to input various instructions to the printing apparatus 100, as well as having a display unit and the like for displaying a status of an operation of the printing apparatus 100. In FIG. 39, reference numeral 111 denotes a main console provided to the host computer 110. The main console 111 has a control key, switches, a display unit, etc. and is used to intervene in an operation of the host computer 110 or watch an operation of the host computer 110 by the operator if necessary.

Referring now to a flowchart (Steps A11 through A14) shown in FIG. 40, description will be made of an operation of the printing apparatus 100 having the structure shown in FIG. 39 if an error (a data error) occurs in data fed from the host computer 110.

As shown in FIG. 40, when the printing apparatus 100 receives data from the host computer 110 (Step A11), the printing apparatus 100 executes a job printing to print out the data on predetermined papers (Step A12).

If a data error occurs during the job printing (Step A13), it is displayed as a message on the display unit on the main console 111 of the host computer 110 or the display unit on the operator panel 108 of the printing apparatus 100 that an error has occurred in the data fed from the host computer 110 (Step A14).

Whereby, the operator can know that the error has occurred in the data fed from the host computer 110. However, the job printing is continuously implemented even if a data error occurs. When the operator confirms occurrence of data error from a message displayed on the display unit, the operator refers results of the printing after the job printing is completed, and confirms a part in which the data error has occurred and takes measures such as correction and the like thereto.

An operation of the printing apparatus 100 having the structure shown in FIG. 39 in the case where a job is cancelled during a job printing by the host computer 110 or the operator will be next described with reference to a flowchart (Steps A21 through A26) shown in FIG. 41.

As shown in FIG. 41, when receiving data from the host computer 110, the printing apparatus 100 executes a job printing to print out the data on predetermined papers (Step A21).

If the job is cancelled during the job printing by the host computer 110 or the operator, pages (data) that have been received by the printing apparatus 100 but are not yet printed out are cleared (Step A22), and it is judged whether there remains any paper in the reversing mechanism unit 102 (Step A23).

In the reversing mechanism unit 102, plural papers only one sides of which have been printed thereon are temporarily stored and turned over, then fed to the monochromatic printing engine 101 to be printed on the remaining sides. If the job is cancelled while a double-side printing is being implemented as a job with such reversing mechanism unit 102, plural papers only one sides of which have been printed thereon (incomplete papers) might remain inside the reversing mechanism unit 102.

In such case, the judgement is YES at Step A23, the incomplete papers are discharged to the tray 106 or the stacker 107 (Step A24), then it is displayed as a message on the display unit on the operator panel 108 of the printing apparatus 100 that the incomplete papers are outputted (Step A25). After that, the next job printing is executed (Step A26).

Whereby, the operator can know that there are paper outputs in an incomplete state. The operator who has confirmed this removes the incomplete papers from normal outputs (results of a normal job printing), as shown in FIG. 42.

An operation of the printing apparatus 100 having the structure shown in FIG. 39 in the case where a jam (a paper jam) occurs during a job printing will be further described with reference to a flowchart (Steps A31 through A34) shown in FIG. 43.

As shown in FIG. 43, when receiving data from the host computer 110, the printing apparatus 100 executes a job printing to print out the data on predetermined papers (Step A31).

If a jam occurs during the job printing, the operator takes measures to the jam to remove the jam. After that, the host computer 110 sends page data for printing a jam message (a message notifying that a jam has occurred) to the printing apparatus 100, and a paper indicating that a jam has occurred during the job output is inserted (Step A32, refer to FIG. 44). After that, a recovery printing of the jam page is implemented as shown in FIG. 44 (Step A33), and the job printing is continued (Step A34).

When the job output from the printing apparatus 100 is over, the operator checks outputted papers. If finding out a jam re-start message, the operator confirms whether there is any missing page in the output before and after the jam re-start message.

If a data error occurs during a job printing in the above printing apparatus 100, only a message that the data error has occurred is displayed on the display unit on the main console 111 of the host computer 110 or the display unit on the operator panel 108 of the printing apparatus 100. Therefore, it is taken time for the operator to find out the data error and correct it since it is difficult for the operator to know on which page and in which position the data error has occurred.

If incomplete papers are outputted due to job cancel, a message of this is displayed on the display unit of the operator panel 108 of the printing apparatus 100. When the operator confirms the display, the operator does a work of confirming the incomplete papers sandwiched between normal output papers to remove them. However, it is difficult for the operator to immediately discriminate a position of the incomplete papers and it is taken time for the operator to do that work.

When the printing apparatus 100 terminates a job printing, the operator checks all outputted papers. If finding a jam message, the operator confirms whether any page before and after the jam message falls out from the outputs. Omission of page is serious problem in the printing apparatus 100. A work of checking all papers in order to confirm whether any omission of page has occurred or not is an extremely large burden on the operator.

SUMMARY OF THE INVENTION

In the light of the above problems, an object of the present invention is to enable the operator to immediately discriminate a position of a check objective paper such as a data error occurring paper, an incomplete paper, a jam message printed paper or the like so as to reduce a burden on the operator and improve reliability of results of printed outputs.

The present invention therefore provides a printing apparatus having a printing mechanism for implementing printing in at least one printing color on a predetermined paper and a control unit for controlling a printing operation of said printing mechanism comprising a detecting unit for detecting an opportunity of printing and outputting a check objective paper that should be an object of confirmation by an operator during a printing operation of said printing mechanism, when said detecting unit detects said opportunity, said control unit controlling said printing mechanism to implement a color printing on said check objective paper in order to discriminate said check objective paper from another printed output papers.

According to the printing apparatus of this invention, the operator can easily discriminate the check objective paper from another printed output papers so as to immediately judge a position of the check objective paper from results of printed outputs. This may largely reduce a burden on the operator and largely improve reliability of the results of the printed outputs.

BRIEF DESCRIPTION OF THE DRAWINGS

FIGS. 8(a) and 8(b) are block diagrams illustrating manners of setting coloring information for a jam message printed paper;

FIG. 9 shows a message display used when a printing color for a data error occurring page is set;

FIGS. 10(a) and 10(b) show message displays used when a printing color for a data error occurring page is set;

FIG. 20 shows an initial character code condition of an ATT besides illustrating a data error occurring due to an undefined character code;

DESCRIPTION OF THE PREFERRED EMBODIMENTS (a) Description of Aspect of the Invention FIG. 1 is a block diagram showing an aspect of this invention. A printing apparatus of this invention shown in FIG. 1 has a printing mechanism 1 for implementing printing on predetermined papers in at least one printing color, a control unit 2 for controlling a printing operation of the printing mechanism 1 and a detecting unit 3 for detecting an opportunity of printing and outputting a check objective paper that is an object of confirmation by the operator.

When the detecting unit 3 detects said opportunity, the control unit 2 controls the printing mechanism 1 to implement a color printing on a check objective paper in order to discriminate the check objective paper from another printed output papers.

If said check objective paper is a paper on which data error in the print data transmitted from an upper apparatus has occurred, the detecting unit 3 detects occurrence of the data error as said opportunity.

If said check objective paper is an incomplete paper outputted following an interruption of the printing according to a job cancel instruction, the detecting unit 3 detects said job cancel instruction as said opportunity.

If said check objective paper is a jam message printed paper printed and outputted after removal of a jam, the detecting unit 3 may detect receipt of jam message information as said opportunity, or detect a jam detection as said opportunity.

If said check objective paper is a paper on which data error in print data transmitted from an upper apparatus has occurred, the color printing may be implemented in a position on the check objective paper in which the data error has occurred.

If the printing mechanism 1 has a multi-color printing function, the printing apparatus may further have a color designating unit for designating a color printed in the color printing. Alternatively, a color printed in the color printing may be designated according to an instruction from an upper apparatus.

The printing apparatus may further have a position designating unit for designating a position on the check objective paper in which the color printing is implemented. Alternatively, a position in which the color printing is implemented may be designated according to an instruction from an upper apparatus. In addition, it is possible to designate in advance a position hardly causing a jam as a position on the check objective paper in which the color printing is implemented.

The printing apparatus may further have a nonvolatile storage unit for storing coloring information necessary for the color printing.

Figure 1:
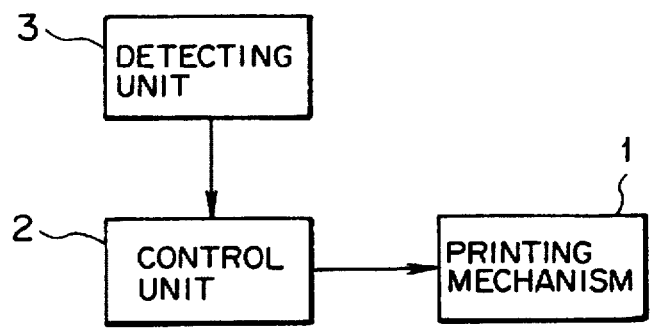
FIG. 1 is a block diagram showing an aspect of this invention.

The printing apparatus of this invention described with reference to FIG. 1 conducts a color printing on a check objective paper so that the operator can easily discriminate the check objective paper from another printed output papers.

A color printing is implemented on the check objective paper taking an occurrence of a data error as an opportunity so that the operator can easily notice data error information. At this time, the color printing is implemented in a position on the check objective paper in which the data error has occurred so that the operator can easily know a page on which the data error has occurred, and a position and a condition of the data error.

The color printing is implemented on an incomplete paper taking a job cancel instruction as an opportunity so that the operator can easily discriminate the incomplete paper from normally outputted papers.

Further, the color printing is implemented on a jam message paper that is a check objective paper taking receipt of jam message information or detection of a jam as an opportunity so that the operator can easily confirm a presence and a position of a jam message printed paper (that is, a presence of a jam having been occurred and a position in which the jam has occurred).

If the printing mechanism 1 can print in multicolors, a color used in the color printing is designated by the color designating unit from the printing apparatus or an upper apparatus so as to discriminate a check objective paper from another printed output papers with an arbitrary color.

A position in which the color printing is implemented by the position designating unit is designated from the printing apparatus or an upper apparatus so that it is possible to implement the color printing in an arbitrary position on the check objective paper. In particular, by designating in advance a position hardly causing a jam as a color printing position, it is possible to prevent a jam from occurring due to the color printing implemented on the check objective paper.

Further, coloring information necessary for the color printing is stored in the nonvolatile storage unit so that the operator can conduct the color printing on the check objective paper as same as before only by referring the information stored in the storage unit without necessity for re-setting the coloring information when the power supply is thrown in again.

As stated above, the printing apparatus of this invention enables the operator to easily discriminate the check objective paper from another printed output papers and immediately judge a position of the check objective paper from results of printed outputs. This may largely reduce a burden on the operator and largely improve reliability of results of printed outputs.

Particularly, it is possible for the operator to easily understand data error information. This may largely reduce a burden on the operator when the operator confirms the data error occurring paper. In addition, the operator can easily know a position in which a data error has occurred and a condition of the data error, whereby an efficiency of correcting a job may be largely improved.

Since the operator can easily discriminate an incomplete paper from normally outputted paper, it is possible to largely reduce a burden on the operator when the operator confirms the incomplete paper and improve an assurance of results of printed outputs.

Further, since the operator can easily confirm a presence and a position of a jam message printed paper, it is possible to largely reduce a burden on the operator when the operator confirms a position in which a jam has occurred and surely check omission of a page due to the jam.

By designating an arbitrary color, it is possible to discriminate the check objective paper from another printed output papers. In addition, it is possible to implement a color printing in an arbitrary position on the check objective paper by designating the position. Whereby, it is possible to set a color printing in a color and in a position that the operator can easily confirm, the operator can thereby confirm the check objective paper more certainly so that a burden on the operator may be largely reduced.

At this time, a position hardly causing a jam is designated in advance as a color printing position for the check objective paper, whereby it is possible to surely prevent a jam from occurring due to the color printing on the check objective paper.

Coloring information necessary for the color printing is stored in a nonvolatile storage unit so that the operator can conduct the color printing on the check objective paper as same as before without necessity of re-setting the coloring information on every occasions when the power supply is thrown in again, which cause little burden on the operator.

(b) Description of a Preferred Embodiment of the Invention

Hereinafter, an embodiment of this invention will be described with reference to the drawings.

Figure 2:
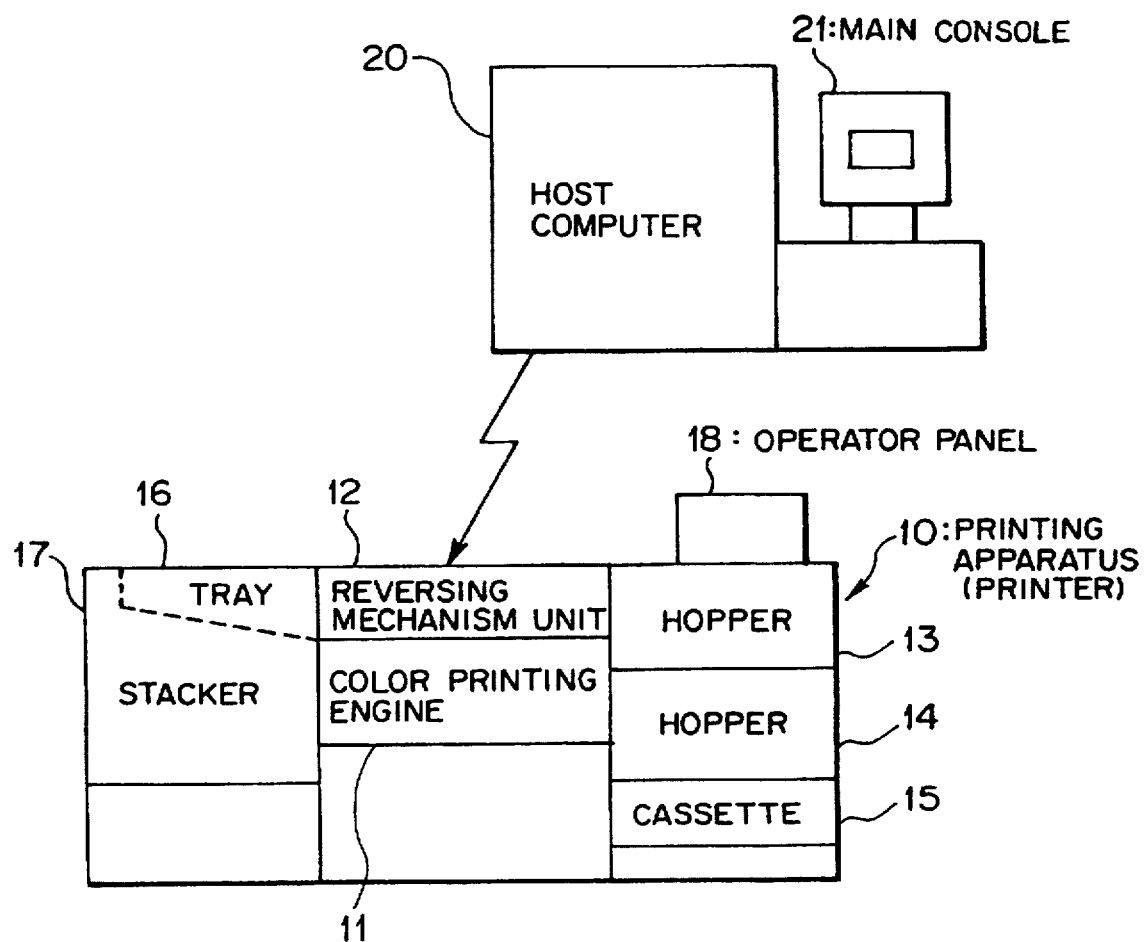
FIG. 2 is a diagram showing a schematic structure of a printing apparatus according to an embodiment of this invention.
Figure 39:
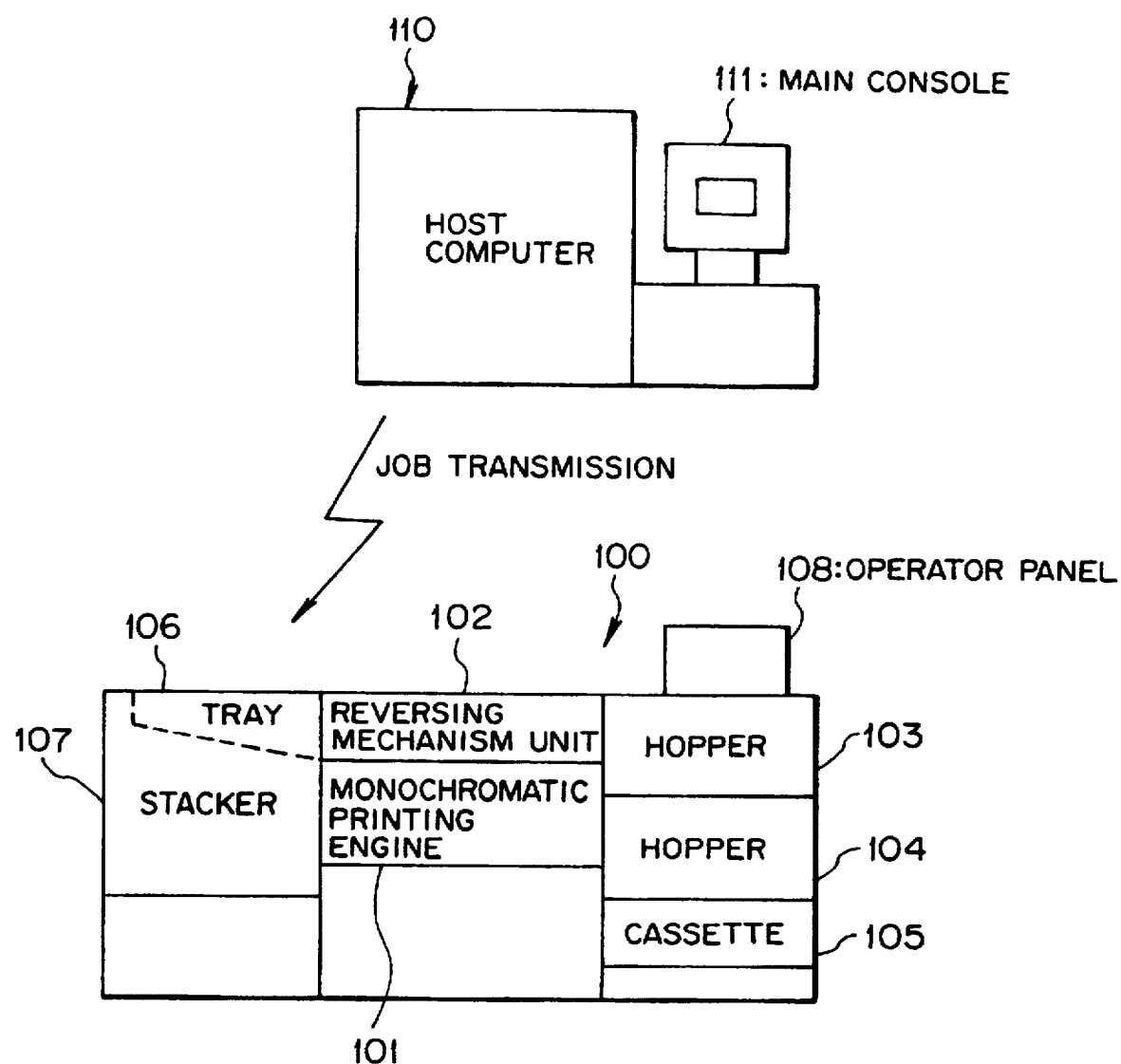
FIG. 39 is a diagram showing a schematic structure of a general printing apparatus.
Figure 40:
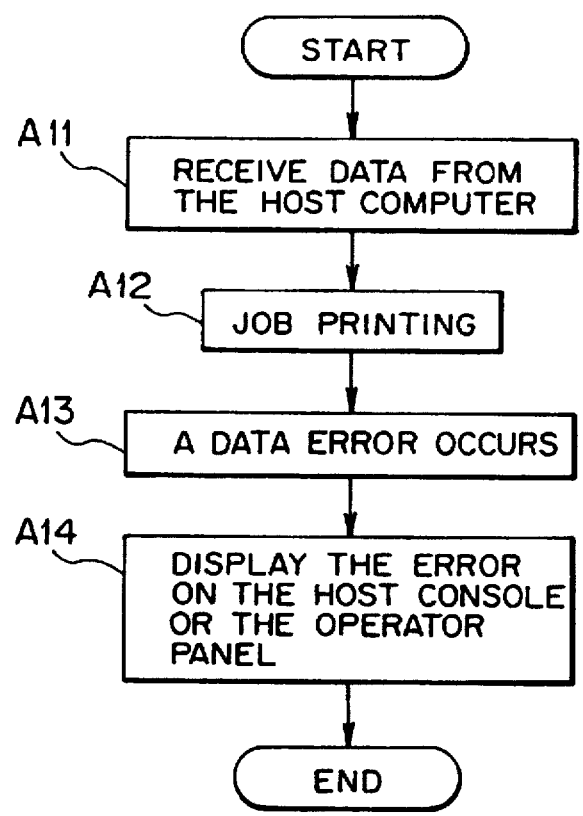
FIG. 40 is a flowchart for illustrating an operation of the general printing apparatus in the event of occurrence of a data error.
Figure 41:
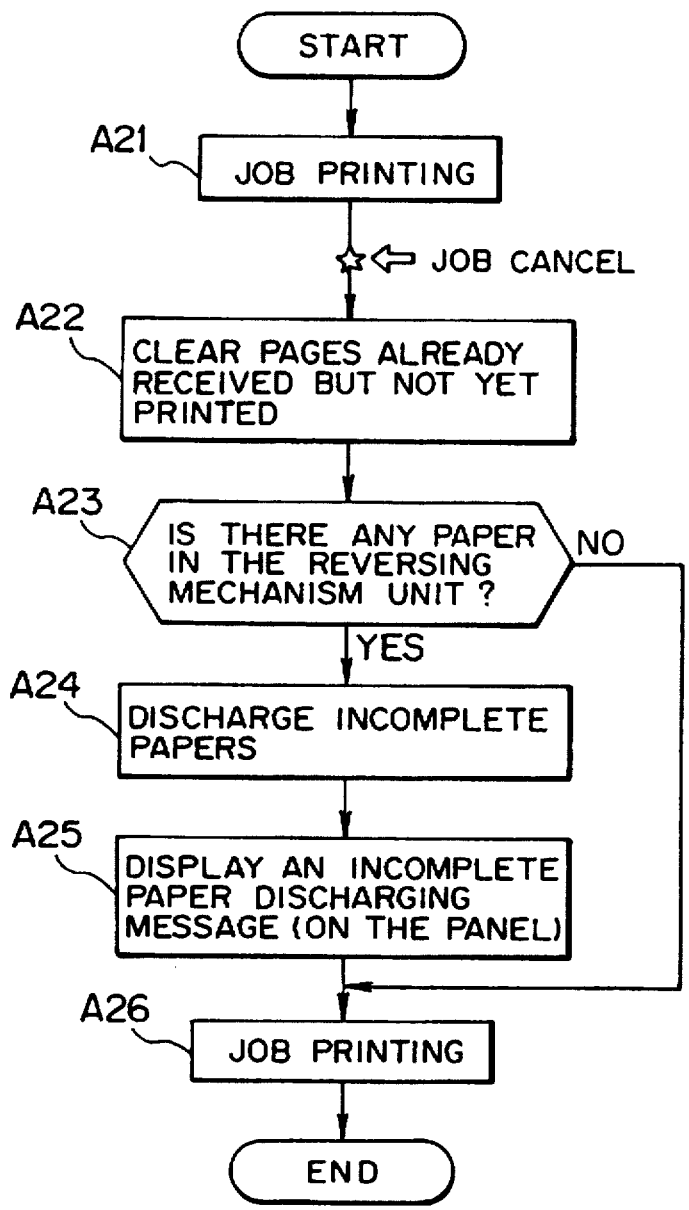
FIG. 41 is a flowchart for illustrating an operation of the general printing apparatus in the case where a job is cancelled.
Figure 42:
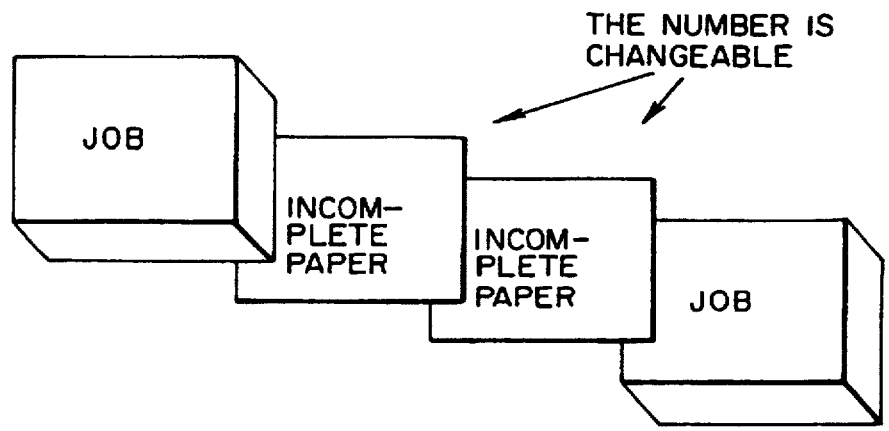
FIG. 42 shows a state of printed outputs of incomplete papers in the case where a job is cancelled.
Figure 43:
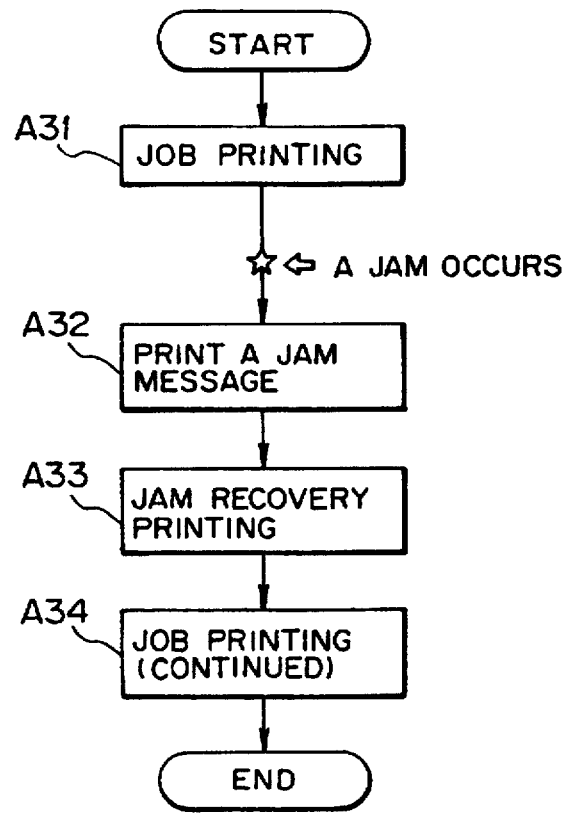
FIG. 43 is a flowchart for illustrating an operation of the general printing apparatus in the event of occurrence of a jam.
Figure 44:
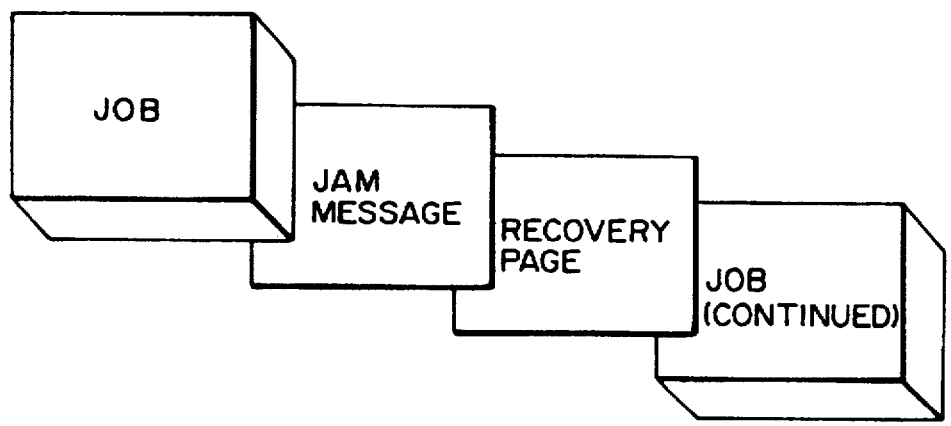
FIG. 44 shows a state of printed outputs of a jam message printed paper and a recovery page in the case where a jam has occurred.

FIG. 2 is a diagram showing a schematic structure of a printing apparatus as an embodiment of this invention. As shown in FIG. 2, the printing apparatus 10 according to this embodiment is configured substantially in a similar manner to the printing apparatus (refer to reference numeral 100) described before with reference to FIG. 39. More specifically, the printing apparatus 10 is connected to a host computer (called simply a host on occasion) 20 which is an upper apparatus to implement a job printing to print data on predetermined papers when receiving the data from the host apparatus 20.

The printing apparatus 10 generally has a color printing engine 11, a reversing mechanism unit (a reversing unit) 12, hoppers 13 and 14, a cassette 15, a tray 16, a stacker 17 and an operator panel 18.

The color printing engine (a printing mechanism) 11 is a mechanism for implementing a color printing in two or more colors on predetermined papers. The printing apparatus 10 of this embodiment is largely different from the printing apparatus 100 shown in FIG. 39 in a point that the printing apparatus 10 of this embodiment has a multi-color printing mechanism for printing in colors by means of the color printing engine 11 whereas the printing apparatus 100 shown in FIG. 39 prints in a monochromatic color. A detailed structure of the color printing engine 11 will be described later with reference to FIG. 3.

The reversing mechanism unit 12 is a mechanism for turning over predetermined papers in order to print on both sides of the papers. The hoppers 13 and 14 store plain papers in predetermined sizes as printing papers, respectively. The cassette 15 stores color papers fed after completion of a certain job printing and before the next job printing to divide the job printings. The tray 16 and the stacker 17 are parts to which printed papers are discharged.

Figure 5:
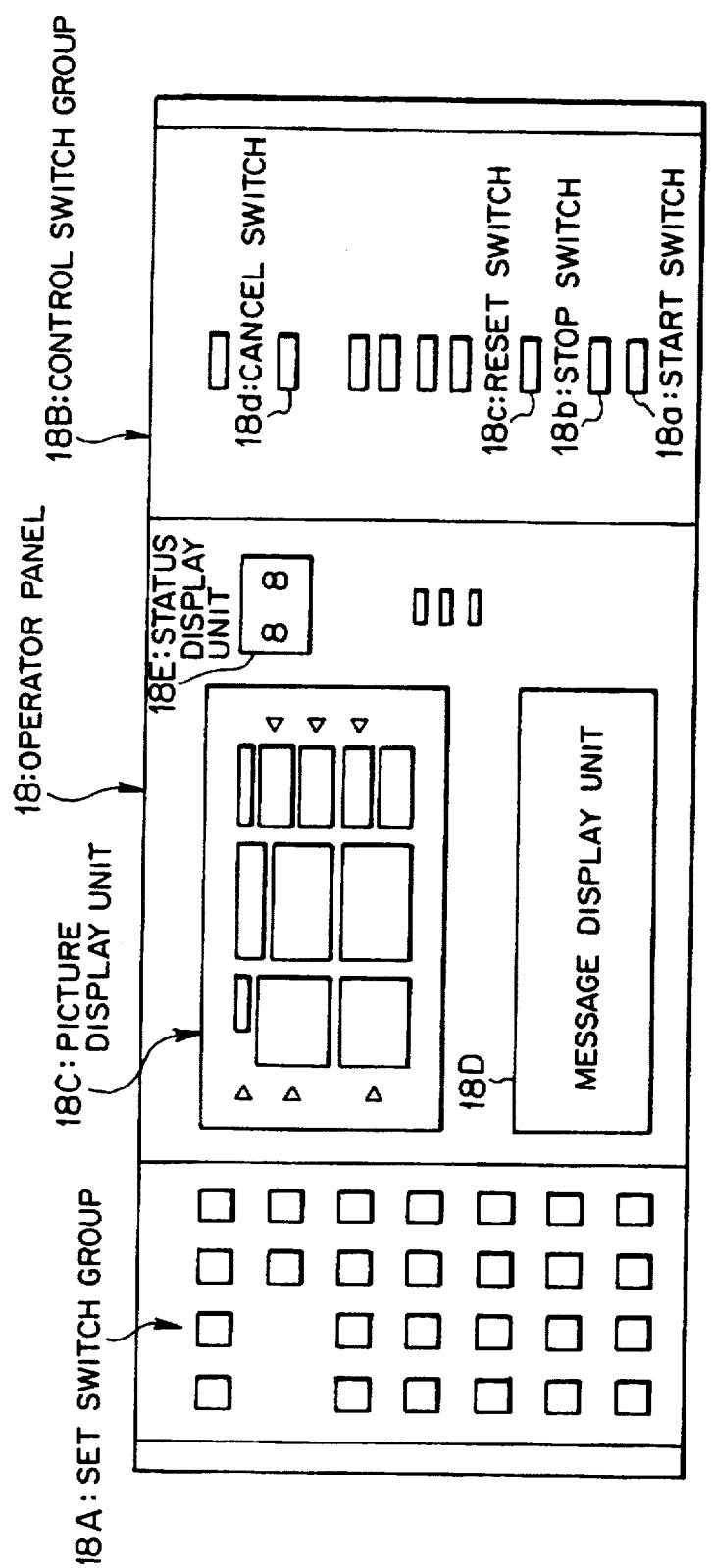
FIG. 5 shows a structure of an operator panel in the printing apparatus according to the embodiment.

The operator panel 18 has, as shown in FIG. 5, a set switch group 18A for setting various operation status and the like to the printing apparatus 10, a control switch group 18B for inputting various instructions to the printing apparatus 10, a picture display unit 18C for displaying a position inside the printing apparatus 10 where a jam, a trouble or the like has occurred, a message display unit 18D for displaying various messages, and a status display unit 18E for displaying an error number or the like corresponding to an abnormality having been occurred inside the printing apparatus 10.

The set switch group 18A includes ten keys and function keys. The ten key in the set switch group 18A functions as a color designating unit and a position designating unit in this embodiment, as will be described later with reference to FIGS. 9 through 14.

The set switch group 18B includes a start switch 18a for starting re-starting a printing operation, a stop switch 18b for stopping a printing operation, a re-set switch 18c, a job cancel switch 18d for cancelling a job printing being executed in the printing apparatus 10 according to an instruction from the host computer 20, etc.

The message display unit 18D displays an error message and the like, as well as displaying information required when various conditions (a printing color, a printing position, etc.) of color printing implemented on a check objective paper are set as shown in, for example, FIGS. 9 through 14.

In FIG. 2, reference numeral 21 denotes a main console (referred simply a console on occasion) provided to the host computer 20. The main console 21 has a control key, switches, a display unit, etc. used to intervene in an operation of the host computer 20 or watch an operation of the host computer 20 by the operator if necessary.

Figure 3:
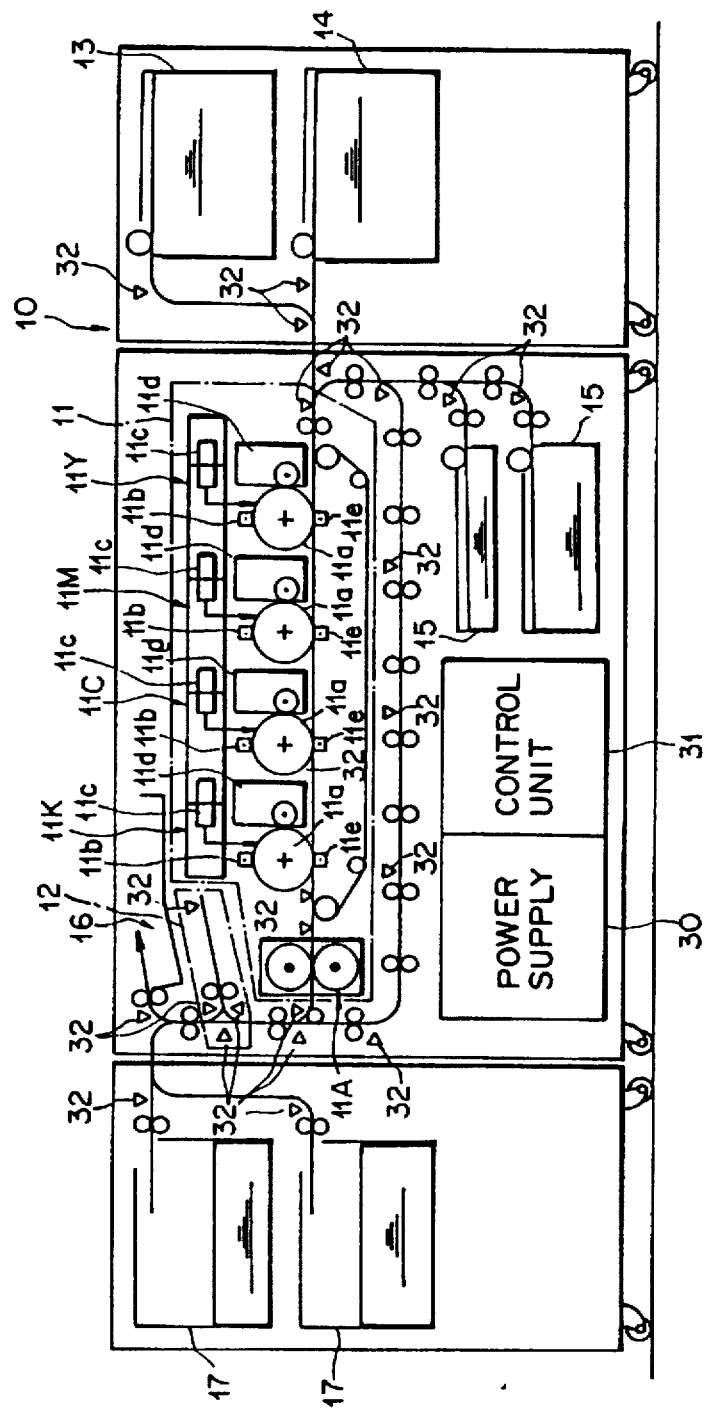
FIG. 3 is a side view of the printing apparatus according to the embodiment in which a detailed internal structure of the printing apparatus is shown.

FIG. 3 is a schematic side view showing a more detailed internal structure of the printing apparatus 10 of this embodiment whose schematic structure has been described schematically with reference to FIG. 2. Incidentally, like reference characters in FIG. 2 designate like or corresponding parts in FIG. 3, detailed descriptions of which are thus omitted here. In the following description, a structure of the color printing engine 11 and an arrangement of a paper detecting sensor 32 served to detect a jam (a paper jam) will be described in detail with reference to FIG. 3.

As shown in FIG. 3, the color printing engine 11 has four developing units 11K, 11C, 11M and 11Y in addition to a fuser 11A. These developing units 11K, 11C, 11M and 11Y are served to print in four colors of black (K), yellow (Y), magenta(M) and cyan (C), each of which has a transfer drum (a photosensitive material) 11a, a pre-charging unit 11b, an optical unit 11c, a developing unit 11d and a transferring unit 11e. The above elements 11a through 11e forming each of the developing units 11K, 11C, 11M and 11Y are quite general. For this, descriptions of these are omitted here.

As the paper detecting sensors 32, optical sensors such as photosensors are used, for example. As shown in FIG. 3, number of paper detecting sensors 32 are disposed along a route on which papers are transferred and, particularly, in positions where a jam is likely to occur inside the printing apparatus 10. To be concrete, the paper detecting sensors 32 are disposed at a portion for taking out papers from the hoppers 13 and 14 and the cassette 15, a bifurcating portion on a transferring route of the papers, in front and behind the fuser 11A, in front and behind the transfer drum 11a of each of the developing units 11K, 11C, 11M and 11Y, at an inlet and an outlet of the reversing mechanism unit 12 and inside the reversing mechanism unit 12, and portions for discharging the papers to the tray 16 and the stacker 17.

In FIG. 3, reference numeral 30 denotes a power supply for supplying an electric power necessary for operation of the printing apparatus 10 to each part, and reference numeral 31 denotes a control unit (a printer controller) for controlling an entire operation of the printing apparatus 10 including a printing operation of the color printing engine 11.

Figure 4:
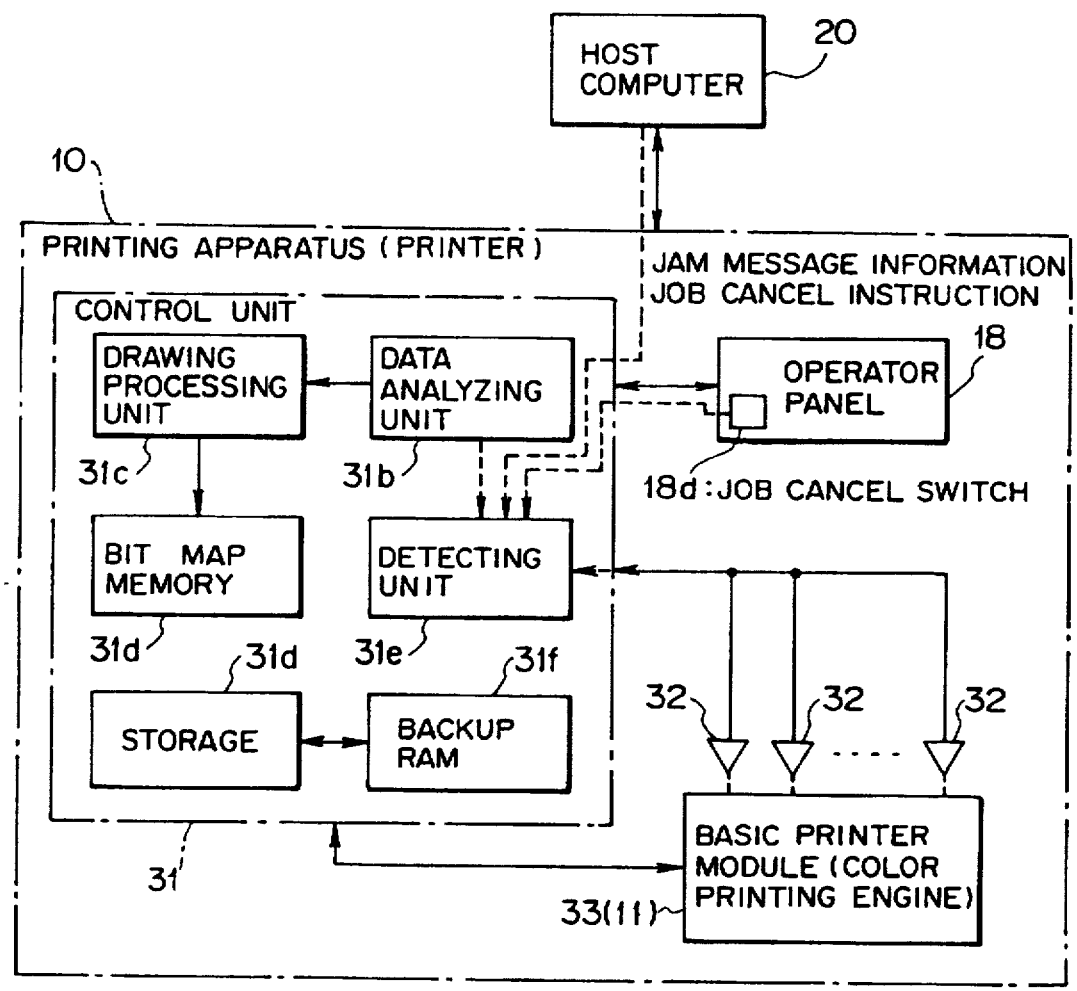
FIG. 4 is a block diagram showing a structure of a control system of the printing apparatus according to the embodiment.

FIG. 4 is a block diagram showing a structure of a control system including a functional structure of the control unit 31 of the printing apparatus 10 according to this embodiment. In FIG. 4, like reference characters designate like or corresponding parts described above, detailed descriptions of which are thus omitted here.

As shown in FIG. 4, the control unit 31 receives print data or commands from the host computer 20 to control a basic printer module 33 including the color printing engine 11 in order to print the print data from the host computer 20 according to conditions or instructions inputted and set through the operator panel 18.

The control unit 31 has a storage 31a, a data analyzing unit 31b, a drawing processing unit 31c, a bit map memory (BMM) 31d, a detecting unit 31e, and a backup RAM 31f.

The storage 31a stores print data fed from the host computer 20, various data necessary for analyzing print data [APTAN file, ATT (Alphanumeric Translation Table), KTT (Kanji Translation Table), merge rule, etc.], various conditions inputted and set through the operator panel 18, messages that should be displayed on the message display unit 18D of the operator panel 18, etc.

The data analyzing unit 31b analyzes print data from the host computer 20 on the basis of various data stored in the storage 31a. The data analyzing unit 31b has a function to notify occurrence of an error of the print data to the host computer 20 and the detecting unit 31e described later if it is judged on the basis of the analysis that the error has occurred.

The drawing processing unit 31c receives print data from the storage 31a, and develops and draws the print data on the bit map memory 31d on the basis of a result of analysis of the print data by the data analyzing unit 31b.

The detecting unit 31e detects an opportunity of printing and outputting a check objective paper that should be an object of confirmation by the operator during a printing operation of the color printing engine 11. Although the control unit and the detecting unit are shown separately as different units in FIG. 1, the control unit 31 includes a function of the detecting unit 31e in this embodiment as shown in FIG. 4. The backup RAM 31f is a nonvolatile storage unit for storing coloring information necessary for implementing a color printing on a check objective paper, as will be described later with reference to FIGS. 6 through 8.

The detecting unit 31e of this embodiment detects three cases where (1) a data error of print data from the host computer 20 has occurred, (2) the control unit 31 receives a job cancel instruction, and (3) a jam has occurred inside the printing apparatus 10, as opportunities of printing and outputting a check objective paper.

At this time, the detecting unit 31e detects occurrence of a data error in the case of the above item (1) by receiving a data error occurrence signal from the data analyzing unit 31b.

The detecting unit 31e detects a job cancel instruction in the case of the above item (2) by receiving a job cancel signal inputting to the control unit 31. The job cancel signal is classified into two types, that is, one is a signal transmitted from the host computer 20 to the printing apparatus 10 by operating the main console 21 by the operator, and the other is a signal directly inputted to the control unit 31 by operating a job cancel switch 18d of the printing apparatus 10 by the operator.

The detecting unit 31e detects occurrence of a jam in the case of the above item (3) by detecting a receipt of jam message information from the host computer 20 or by directly detecting a signal from any one of the paper detecting sensors 32 disposed in various points inside the printing apparatus 10 as described hereinbefore (refer to FIG. 3).

The control unit 31 has a function to make the message display unit 18D of the operator panel 18 display an effect that a jam has occurred, and a function to report an effect that a jam has occurred to the host computer 20 when the paper detecting sensor 32 detects occurrence of a jam inside the printing apparatus 10.

The control unit 31 of this embodiment has a function to perform the following controls when the above-mentioned detecting unit 31e detects an opportunity of printing and outputting a check objective paper as described in the above items (1) through (3).

If the detecting unit 31e detects occurrence of a data error in the case of the above item (1), the control unit 31 controls the color printing engine 11 to implement a color printing on a data occurring page (a check objective paper) printed thereon print data including the data error in order to discriminate the paper from another printed output papers.

When the detecting unit 31e detects a job cancel instruction in the case of the above item (2), the control unit 31 controls the color printing engine 11 to implement a color printing on an incomplete paper printed and outputted following an interruption of the printing according to the job cancel instruction in order to discriminate the paper from another printed output papers.

Further, when the detecting unit 31e detects occurrence of a jam in the case of the above item (3), the control unit 31 controls the color printing engine 11 to implement a color printing on a jam message printed paper (a paper on which a message that a jam has occurred is printed; a check objective paper) printed and outputted after removal of the jam in order to discriminate the paper from another printed output papers.

In a printing apparatus 10 of this embodiment, it is possible to designate a color or a printing position in advance when a color printing is implemented on a check objective paper. The color designation and position designation are feasible on data error occurring pages, incomplete papers and jam messages described above, respectively, from the host computer 20 or the operator panel 18 of the printing apparatus 10.

Figures 6A, 6B:
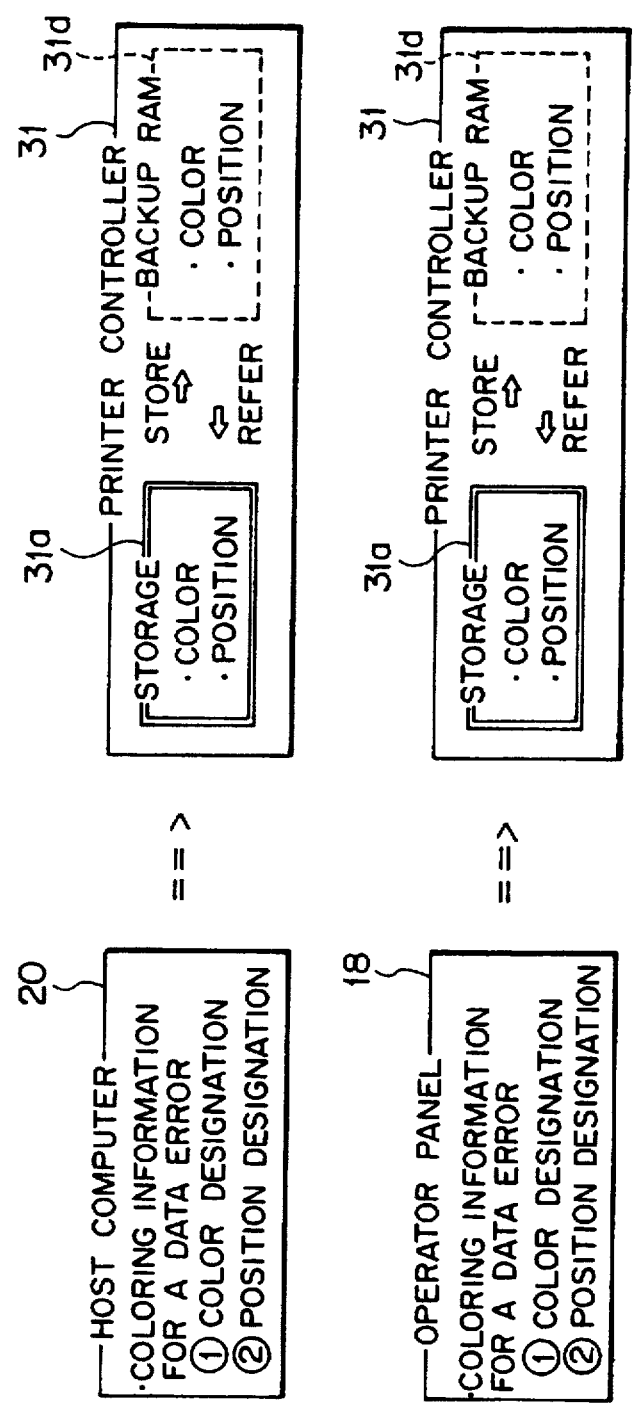
FIGS. 6(a) and 6(b) are block diagrams illustrating manners of setting color information for a data error occurring page.

Coloring information [(1) color designating information and (2) position designating information] for a data error occurring page may be, for example, transmitted to the control unit 31 of the printing apparatus 10 from the host computer 20, as shown in FIG. 6(a), or may be inputted to and set in the control unit 31 from the operator panel 18, as shown in FIG. 6(b). Incidentally, an inputting manner from the operator panel 18 will be described later with reference to FIGS. 9 and 10.

Figure 7A:
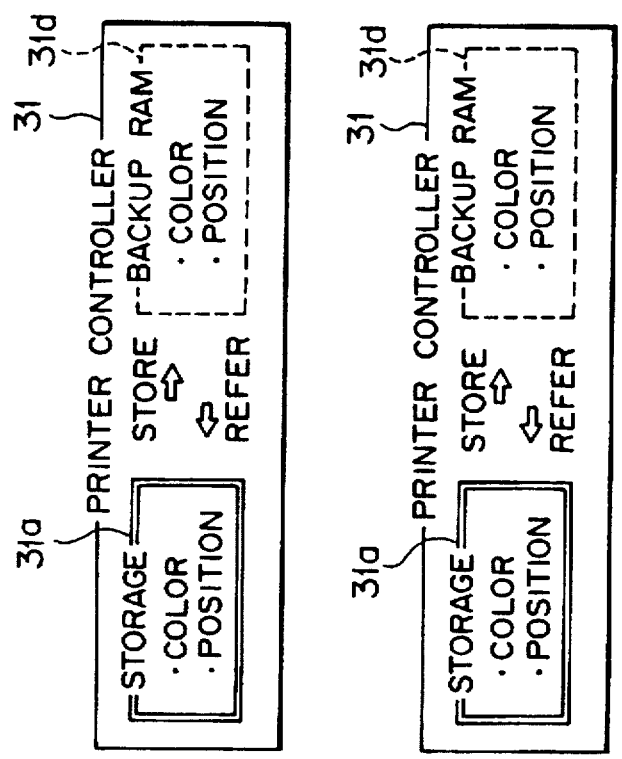
FIGS. 7(a) and 7(b) are block diagrams illustrating manners of setting coloring information for an incomplete paper.
Figure 7B:
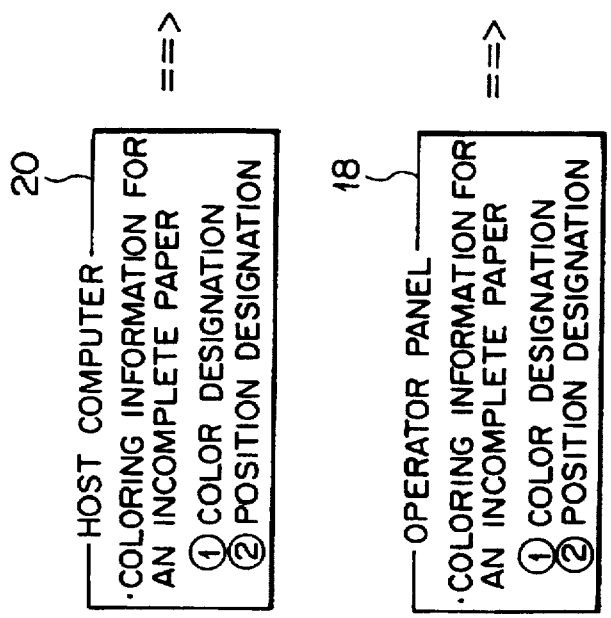

Coloring information for incomplete papers [(1) color designating information and (2) position designating information] may be transmitted from the host computer 20 to the control unit 31 of the printing apparatus 10 as shown in FIG. 7(a), or may be inputted to and set in the control unit 31 from the operator panel 18 as shown in FIG. 7(b), as well. Incidentally, an inputting manner from the operator panel 18 will be described later with reference to FIGS. 11 and 12.

Similarly, coloring information for jam message printed papers [(1) color designating information and (2) position designating information] may be transmitted from the host computer 20 to the control unit 31 of the printing apparatus 10 as shown in FIG. 8(a), or may be inputted to and set in the control unit 31 from the operator panel 18 as shown in FIG. 8(b). Incidentally, an inputting manner from the operator panel 18 will be described later with reference to FIGS. 13 and 14.

As shown in FIGS. 6 through 8, the coloring information set from the host computer 20 or the operator panel 18 is temporarily stored in the storage 31a in the control unit 31, being stored in the backup RAM 31f when the power supply is cut. In a normal operation (when the power supply is thrown in again), the coloring information stored in the backup RAM 31f is referred to and read out on the storage 31a, and a color printing is implemented on a check objective paper on the basis of the coloring information.

When the coloring information for data error occurring pages is inputted and set from the operator panel 18 as shown in FIG. 6(b), displays as shown in, for example, FIGS. 9 and 10 are on the display unit 18D of the operator panel 18, and the operator operates the ten key or the like in the set switch group 18A shown in FIG. 5 while referring the displays.

FIG. 9 shows a state of a display on the message display unit 18D referred when a printing color for data error occurring pages is set. In the state of the display shown in FIG. 9, it is possible to select any number from "1" through "7" using the ten key in the set switch group 18A to designate one color as a printing color out of seven colors of yellow, pink, light blue, red, green, blue and black. FIG. 9 shows a state where the number "4" is selected so as to designate red as a printing color. Contents of the designation are clearly shown on the message display unit 18D by display inversion or the like (displayed in half-tone screen in FIG. 9).

FIGS. 10(a) and 10(b) show states of displays on the message display unit 18D referred when a coloring position on data error occurring pages is set.

As shown in the upper part of FIG. 10(a) or FIG. 10(b), setting of a coloring position is done in either a mode where the coloring position is set to an arbitrary position that the operator can easily recognize (a position described later with reference to FIGS. 15 and 18), or a mode where the coloring position is automatically set to a predetermined position designated in advance (a position described later with reference to FIG. 16).

FIG. 10(a) shows an example of displays in the case where a mode in which a coloring position on data error occurring pages is set to an arbitrary position is selected. In the example shown in FIG. 10(a), the number "1" is selected using the ten key in the set switch group 18A to select a mode of setting a coloring position to an arbitrary position. If this mode is selected, a display as shown in the lower part of FIG. 10(a) next appears on the message display unit 18D.

Figures 15A, 15B, 15C:
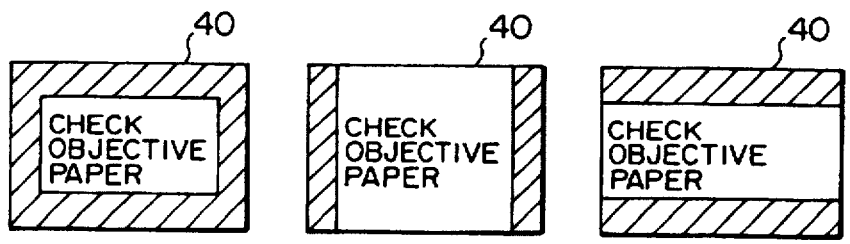
FIGS. 15(a) through 15(c) show position patterns selected by an operator when a coloring position is arbitrary set.
Figure 18:
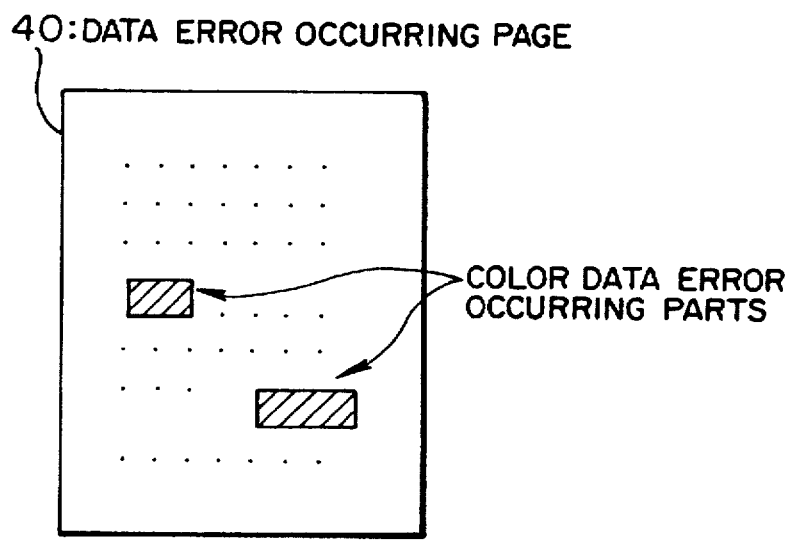
FIG. 18 shows an example of a color printing on data error occurring parts.

By selecting any one of the numbers "1" through "4" through the ten key in the set switch group 18A, it is possible to designate one out of entire periphery [refer to FIG. 15(a)], left and right [refer to FIG. 15(b)], top and bottom [refer to FIG. 15(c)] and positions in which data errors have occurred (refer to FIG. 18). FIG. 10(a) shows a state where the number "2" is selected so as to designate a mode of coloring the left and right positions on check objective papers (data error occurring pages) 40.

FIG. 10(b) shows an example of a display in the case where a mode of automatically setting a coloring position for data error occurring pages is selected. In other words, in the example shown in FIG. 10(b), the number "2" is selected through the ten key in the set switch group 18A so as to select a mode of automatically setting a coloring position. In this case, a coloring position is automatically controlled by the control unit 31 to be in a position hardly causing a jam (a low jam rate position).

Figure 16:
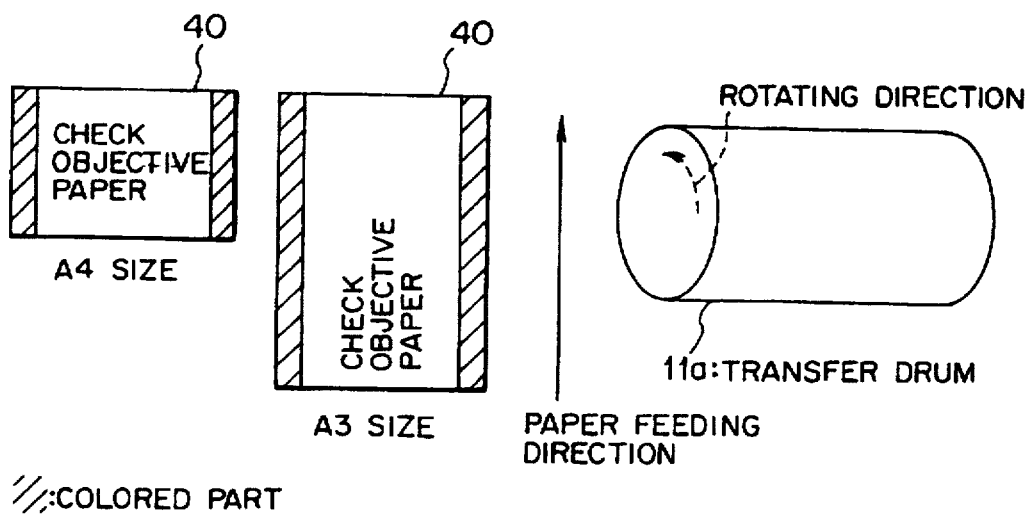
FIG. 16 shows coloring positions hardly causing a jam.
Figure 17:
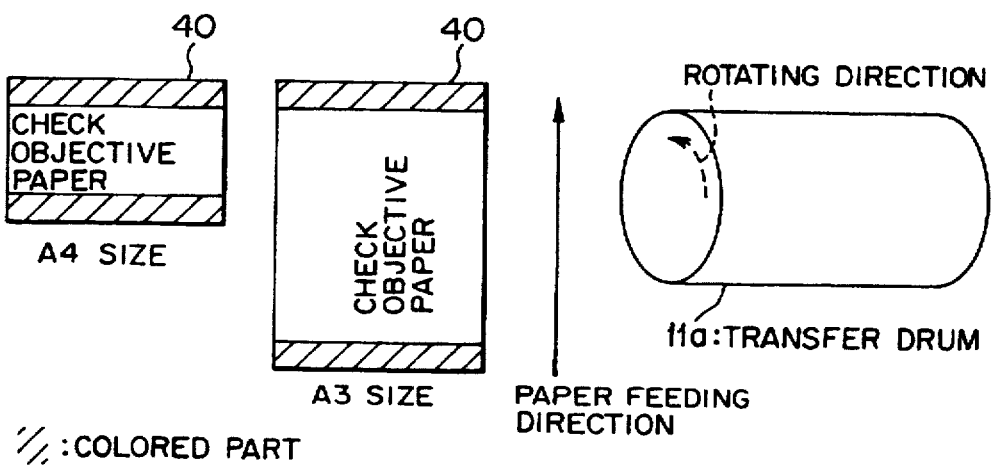
FIG. 17 shows coloring positions easily causing a jam.

Here, the low jam rate positions are practically positions as shown in FIG. 16. If coloring is done throughout a direction of a width of a paper (a direction in parallel to a rotating axis of the transfer drum 11a) perpendicular to a paper feeding direction of a check objective paper 40 as shown in FIG. 17, for example, it is difficult that the paper 40 comes off the transfer drum 11a so that a jam easily occurs. To the contrary, if coloring is done throughout a direction of a length of a paper (a direction perpendicular to the rotating axis of the transfer drum 11a) in parallel to the paper feeding direction of the check objective paper 40 as shown in FIG. 16, the paper 40 easily comes off the transfer drum 11a so that a jam rate largely drops as compared with the example shown in FIG. 17.

Figure 19A:
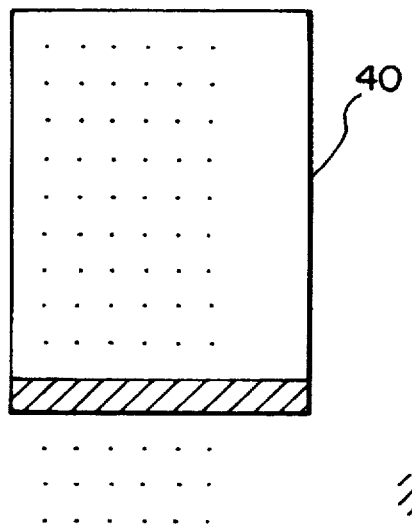
FIGS. 19(a) and 19(b) show examples of a color printing implemented when a data lost error has occurred.
Figure 19B:
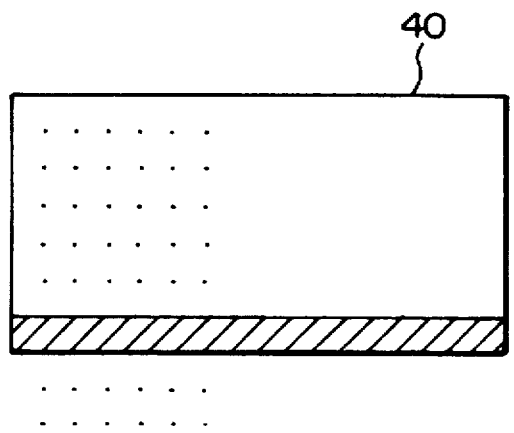

Upon designating a coloring position as described above, contents of the designation are clearly shown on the message display unit 18D by display inversion or the like [display in half-tone screen in FIGS. 10(a) and 10(b)], as well. As will be described later, if "Data Lost Error" occurs as a data error, coloring is done throughout a width on a side where data overflows as shown in FIGS. 19(a) and 19(b).

In FIGS. 15 through 17, reference numeral 40 denotes a check objective paper such as a data error occurring page, an incomplete paper, a jam message printed paper, etc. Reference numeral 40 in FIGS. 18 and 19 also denotes a check objective paper, but these check objective papers 40 are limited particularly to data error occurring pages.

Figure 11:
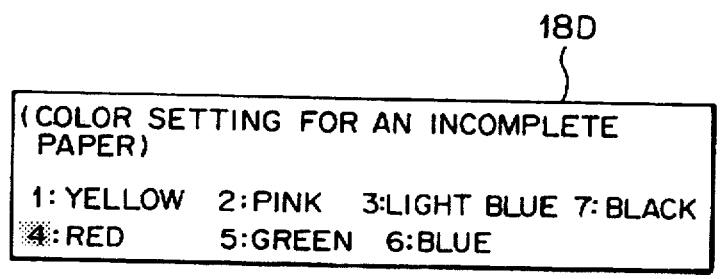
FIG. 11 shows a message display used when a printing color for an incomplete paper is set.

FIG. 11 shows a state of a display on the message display unit 18D referred when a printing color for incomplete papers is set. Under the state of a display shown in FIG. 11, any one of the numbers "1" through "7" is selected using the ten key of the set switch group 18A, thereby designating one out of seven colors of yellow, pink, light blue, red, green, blue and black as a printing color. FIG. 11 shows a state where the number "4" is selected so as to designate red as a printing color, and contents of the designation are clearly shown by a display inversion or the like (in half-tone screen in FIG. 11) on the message display unit 18D.

Figure 12A:
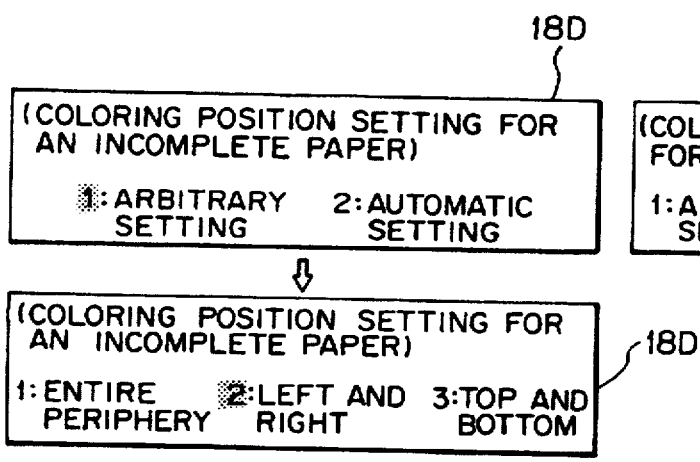
FIGS. 12(a) and 12(b) show message displays used when a coloring position for an incomplete paper is set.
Figure 12B:
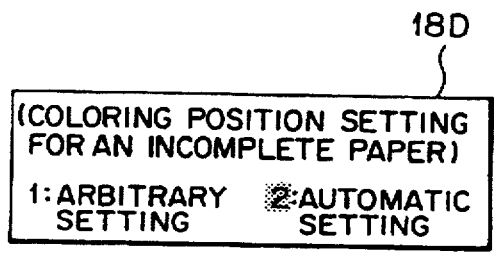

FIGS. 12(a) and 12(b) show states of displays on the message display unit 18D referred when a coloring position for incomplete papers is set.

As shown in the upper part of FIG. 12(a) or FIG. 12(b), either a mode of setting a coloring position to an arbitrary position that the operator can easily recognize [refer to FIGS. 15(a) through 15(c)] or a mode of automatically setting a coloring position to a predetermined position (a position described hereinbefore with reference to FIG. 16) is selected upon setting a coloring position.

FIG. 12(a) shows an example of displays in the case where a mode of setting a coloring position for incomplete papers to an arbitrary position is selected. More specifically, the number "1" is selected through the ten key in the set switch group 18A so as to select a mode of setting a coloring position to an arbitrary position. If this mode is selected, a display shown in the lower part of FIG. 12(a) next appears of the message display unit 18D.

By selecting any one of the numbers "1" through "3" through the ten key of the set switch group 18A, it is possible to designate one out of entire periphery [refer to FIG. 15(a)], left and right [refer to FIG. 15(b)], top and bottom [refer to FIG. 15(c)] as a coloring position. FIG. 12(a) shows a state where the number "2" is selected so as to designate a mode of coloring the right and left positions of a check objective paper (an incomplete paper) 40 as shown in FIG. 15(b).

FIG. 12(b) shows an example of a display in the case where a mode of automatically setting a coloring position for incomplete papers is selected. More specifically, in the example shown in FIG. 12(b), the number "2" is selected through the ten key in the set switch group 18A so that a mode of automatically setting a coloring position is selected. In this case, a coloring position is controlled by the control unit 31 to be in a position hardly causing a jam (a low jam rate position) shown in FIG. 16.

Upon designating a coloring position, contents of the designation are clearly shown on the message display unit 18D by display inversion or the like [in half-tone screen in FIGS. 12(a) and 12(b)].

Figure 13:
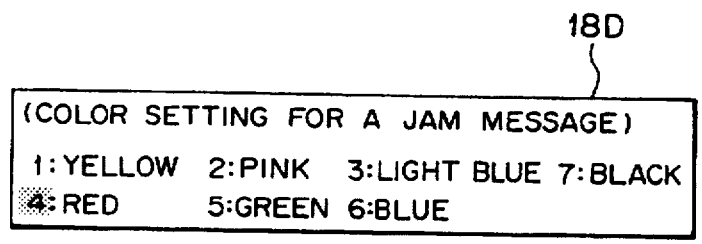
FIG. 13 shows a message display used when a printing color for a jam message printed paper is set.

FIG. 13 shows a state of a display on the message display unit 18D referred when a printing color for jam message printed papers is set. By selecting any one of the numbers "1" through "7" using the ten key in the set switch group 18A under the state of the display shown in FIG. 13, it is possible to designate one out of seven colors of yellow, pink, light blue, red, green, blue and black as a printing color. FIG. 13 shows a state where the number "4" is selected so as to designate red as a printing color, and contents of the designation are clearly shown on the message display unit 18D by display inversion or the like (in half-tone screen in FIG. 13).

Figures 14A, 14B:
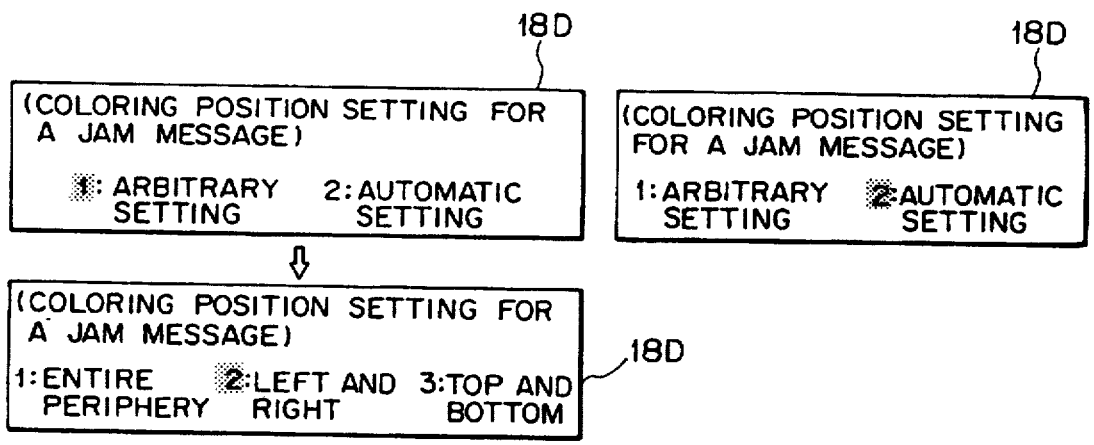
FIGS. 14(a) and 14(b) show message displays used when a coloring position for a jam message printed paper is set.

FIGS. 14(a) and 14(b) show states of displays on the message display unit 18D referred when a coloring position for jam message printed papers is set.

As shown in the upper part of FIG. 14(a) or FIG. 14(b), either a mode of setting a coloring position to an arbitrary position that the operator can easily recognize [refer to FIGS. 15(a) through 15(c)] or a mode of automatically setting a coloring position to a predetermined position designated in advance (a position described hereinbefore with reference to FIG. 16) is designated upon setting a coloring position.

FIG. 14(a) shows an example of displays in the case where a mode of setting a coloring position for jam message printed papers to an arbitrary position is selected. More specifically, the number "1" is selected through the ten key in the set switch group 18A so as to select a mode of setting a coloring position to an arbitrary position in the example shown in FIG. 14(a). If this mode is selected, a display as shown in the lower part of FIG. 14(a) appears on the message display unit 18D.

By selecting any one of the numbers "1" through "3" through the ten key in the set switch group 18A, it is possible to designate one out of entire periphery [refer to FIG. 15(a)], left and right [refer to FIG. 15(b)] and top and bottom [refer to FIG. 15(c)] as a coloring position. FIG. 14(a) shows a state where the number "2" is selected so as to designate a mode of coloring the left and right positions of the check objective paper (jam message printed paper) 40 as shown in FIG. 15(b).

FIG. 14(b) shows an example of a display in the case where a mode of automatically setting a coloring position for jam message printed papers is selected. More specifically, the number "2" is selected through the ten key in the set switch group 18A so as to designate a mode of automatically setting a coloring position in the example shown in FIG. 14(b). In this case, a coloring position is controlled by the control unit 31 to be in a position hardly causing a jam (a low jam rate position) shown in FIG. 16.

Upon designating a coloring position, contents of the designation are clearly shown on the message display unit 18D by display inversion or the like [in half-tone screen in FIGS. 14(a) and 14(b)].

In the examples of designation of a printing color or a coloring position, red color is applied on the left and right position of any of a data error occurring page, an incomplete paper and a jam message printed paper. It is alternatively possible to apply a different color in different positions for each type of the check objective papers.

A coloring operation of the printing apparatus 10 of this embodiment having the above structure and being set coloring information therein will be next described, classifying the operation into three cases: in the event of occurrence of a data error; in the event of a job cancel instruction (in the event of occurrence of an incomplete paper); and in the event of occurrence of a jam (in the event of an output of a jam message).

(b1) Coloring operation in the event of occurrence of a data error

A data error that becomes an object of coloring in this embodiment is an error which can suppress "Data Check". In detail, the data error is classified into four types: (a) "Unprintable Character 1"; (2) "Unprintable Character 2"; (c) "Multiple Characters"; and (d) "Data Lost Error", which will be described below.

Here, "Data Check" is information reported to the host computer 20 from the printing apparatus 10 (the control unit 31) if an error is detected in print data or a command including channel skip. If a data error has occurred, the printing apparatus 10 transmits "Data Check" to the host computer 20, and sets sense information to stop a printing.

However, the printing apparatus 10 has a mode (Block Data Check) to suppress outputting the above "Data Check". In this mode, the printing apparatus 10 suppresses outputting "Data Check" in the case of a data error, and continues a job without stopping the job, and without reporting the data error to the host computer 20 and setting sense information. It is assumed that a mode to suppress outputting "Data Check" as above is set in the printing apparatus 10 of this embodiment.

"Unprintable Character 1" is an error occurring when a character undefined on an ATT (Alphanumeric Translation Table) exists in characters (alphanumeric characters, kana characters, etc.) of one-byte system code designated by print data. This error will be next described by way of an ATT0 after the power supply of the printing apparatus 10 has been thrown in. An initial character code condition of the ATT0 is as shown in FIG. 20, for example. If a code X "2A" is selected under the condition of the ATT0, for example, a data error occurs since character corresponding to that code is not assigned in the ATT0 and is thus undefined. A printing part in which this error has occurred becomes a blank output.

"Unprintable character 2" is an error occurring when a character undefined on a KTT (Kanji Translation Table; two-byte system character conversion table) exists in characters (Chinese characters, etc.) of the two-byte system code designated by print data, similarly to "Unprintable Character 1". A part of the print in which this error has occurred becomes a blank output as well.

"Multiple Characters" is an error occurring when there exists a combination of merges not allowed. There is a case where a merge process of combining and overlapping two types of characters to print is implemented in a printing process, in general. As to such merge process, combinations of characters which are allowed to be combined are determined in advance as a merge rule. In consequence, if an instruction of a merge process is included in print data, the control unit 31 (the data analyzing unit 31b) judges whether the merge process is against the merge rule or not. In a part of print in which this error has occurred, only characters on the first line are printed.

"Data Lost Error" is an error occurring when there exists a character printed in a line overflowing from a paper.

Figures 21, 22:
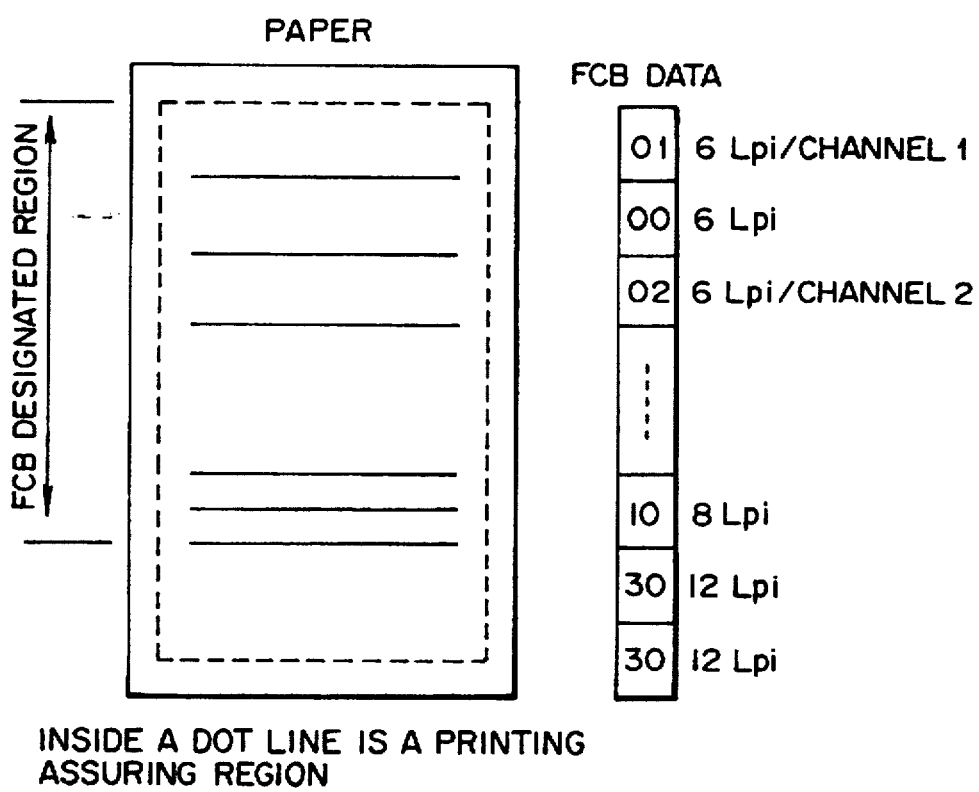
FIG. 21 is a diagram for illustrating an FCB.
FIG. 22 shows a data format set in the FCB.

In a printing process, carriage codes in number equal to the number of lines for one page each of which consists of a line pitch and a channel number are, in general, set in array in an FCB (Forms Control Buffer) served to control lines within a page so as to define a structure of one page and channel positions as shown in, for example, FIG. 21. A format of data set in the FCB is, in concrete, in an eight-bit structure as shown in FIG. 22. The leading two bits are reserve bits and the following two bits are bits used to set a line pitch. Here, the bits for setting the line pitch allows to set four types of line pitches as shown in FIG. 22. The last four bits are bits used to set a channel number. It is possible to shift to a channel position (channel number) set in these last-four bits using "skip to channel" system command. Incidentally, "Lpi" in FIG. 21 means line/inch (Lines per inch).

Figure 23:
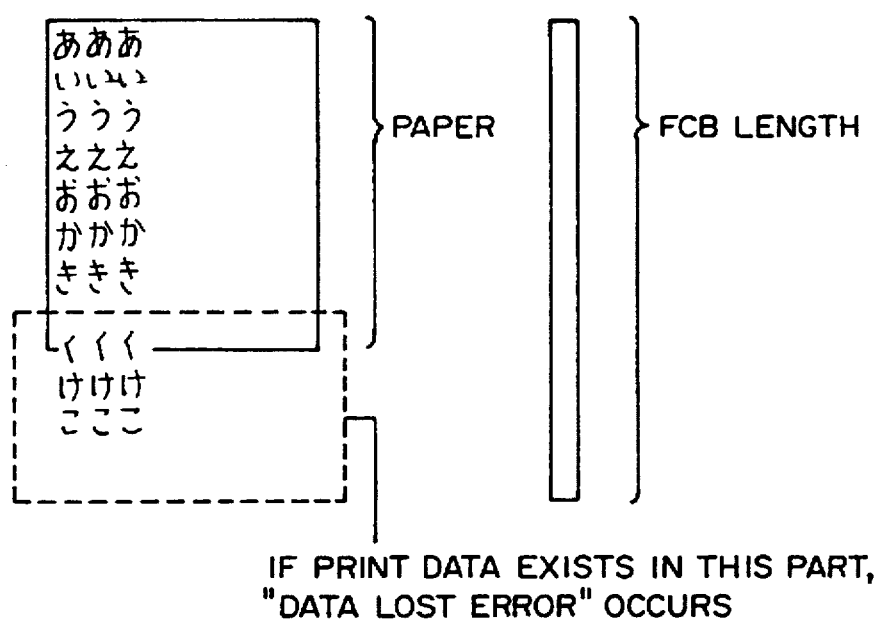
FIG. 23 is a diagram for illustrating a data lost error.
Figure 24:
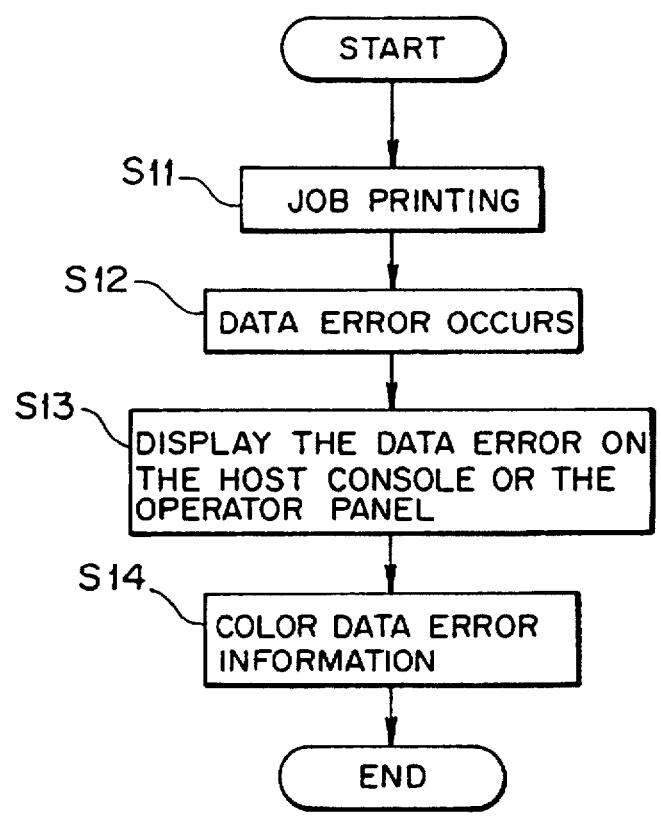
FIG. 24 is a flowchart for illustrating a basic operation of the printing apparatus according to the embodiment in the event of occurrence of a data error.

At this time, if a printing region (an FCB length) longer than a length of a paper is set to the FCB mentioned above as shown in FIG. 23, lines which cannot be printed on the paper might occur. If there exists character data in a line which cannot be printed as this, "Data Lost Error" occurs.

An operation of the printing apparatus 10 of this embodiment in the event where an data error as above has occurred will be next described with reference to FIGS. 24 through 29. A basic operation of the printing apparatus 10 in the event of occurrence of a data error will be first described with reference to a flowchart (Steps S11 through S14) shown in FIG. 24 and schematic diagrams shown in FIGS. 25 through 28.

Figure 25:
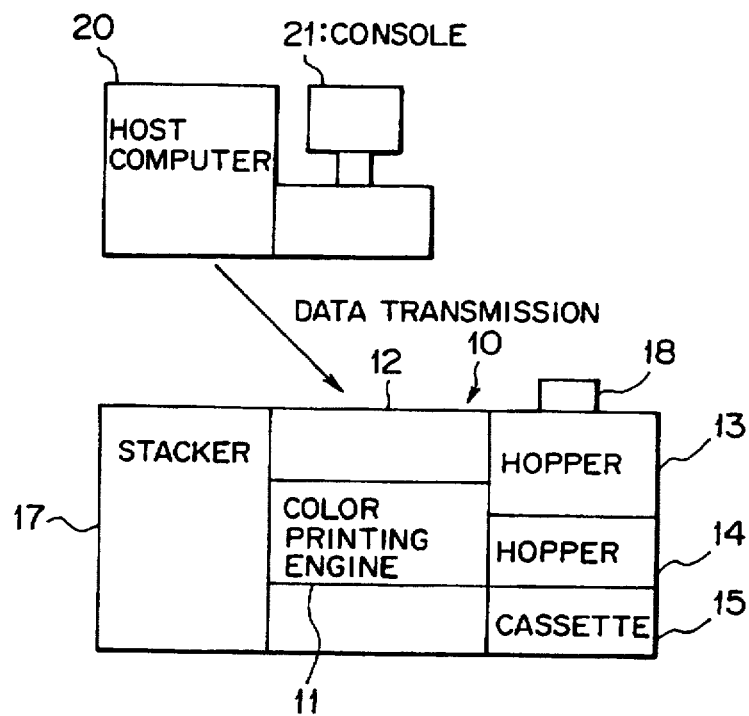
FIG. 25 is a diagram for illustrating a basic operation of the printing apparatus according to the embodiment in the event of occurrence of a data error.
Figure 26:
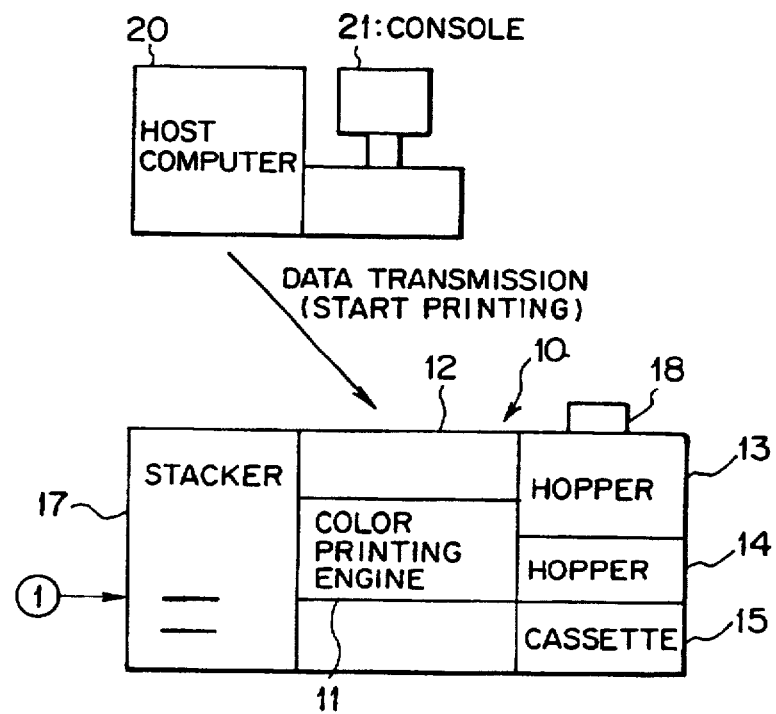
FIG. 26 is a diagram for illustrating a basic operation of the printing apparatus according to the embodiment in the event of occurrence of a data error.

When the printing apparatus 10 receives print data from the host computer 20 as shown in FIG. 25, the printing apparatus 10 initiates a job printing as shown in FIG. 26 (Step S11). At this time, normally printed papers [refer to ①] in the drawing] are discharged to the stacker 17 of the printing apparatus 10.

Figure 27:
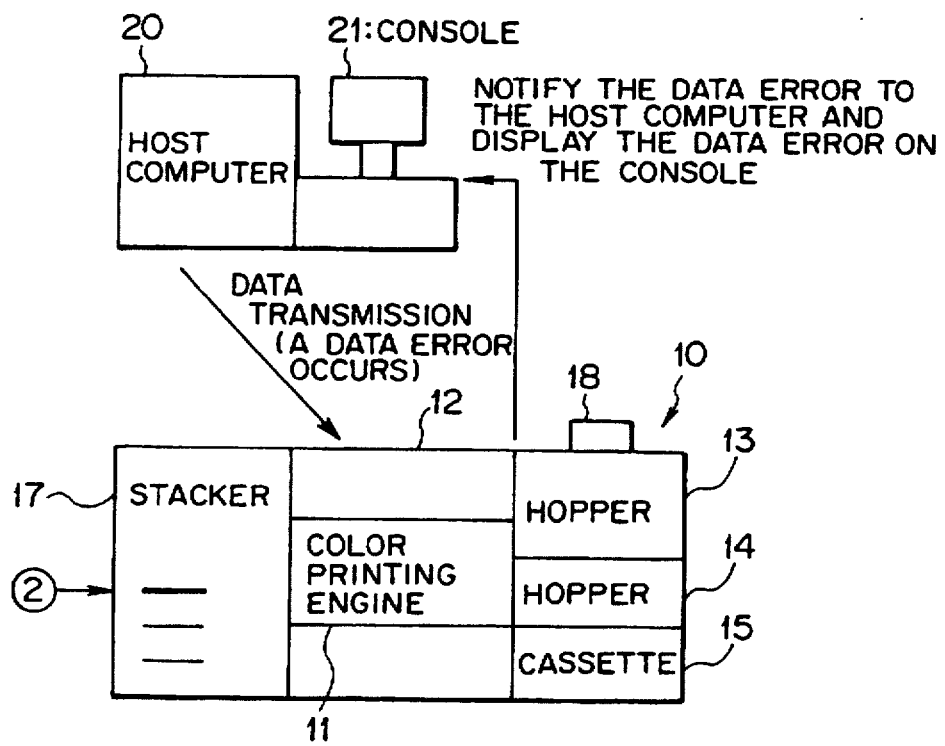
FIG. 27 is a diagram for illustrating a basic operation of the printing apparatus according to the embodiment in the event of occurrence of a data error.

In the job printing process, if the detecting unit 31e (refer to FIG. 4) detects that a data error as described above has occurred in the print data fed from the host computer 20 (Step S12), the occurrence of the data error is notified to the host computer 20 as shown in FIG. 27, and this effect is displayed on the main console 21 of the host computer 20 or the operator panel 18 (the message display unit 18D) of the printing apparatus 10 (Step S13).

At this time, the printing apparatus 10 is set to a mode of suppressing an output of "Data Check" in this embodiment as described above. If a data error which can suppress an output of "Data Check" has occurred, the job printing is continued, and data error information is printed in a color on a page in which the data error has occurred that should be a check objective paper according to coloring information (a color, a position) designated in advance as stated above (Step S14).

Figure 29:
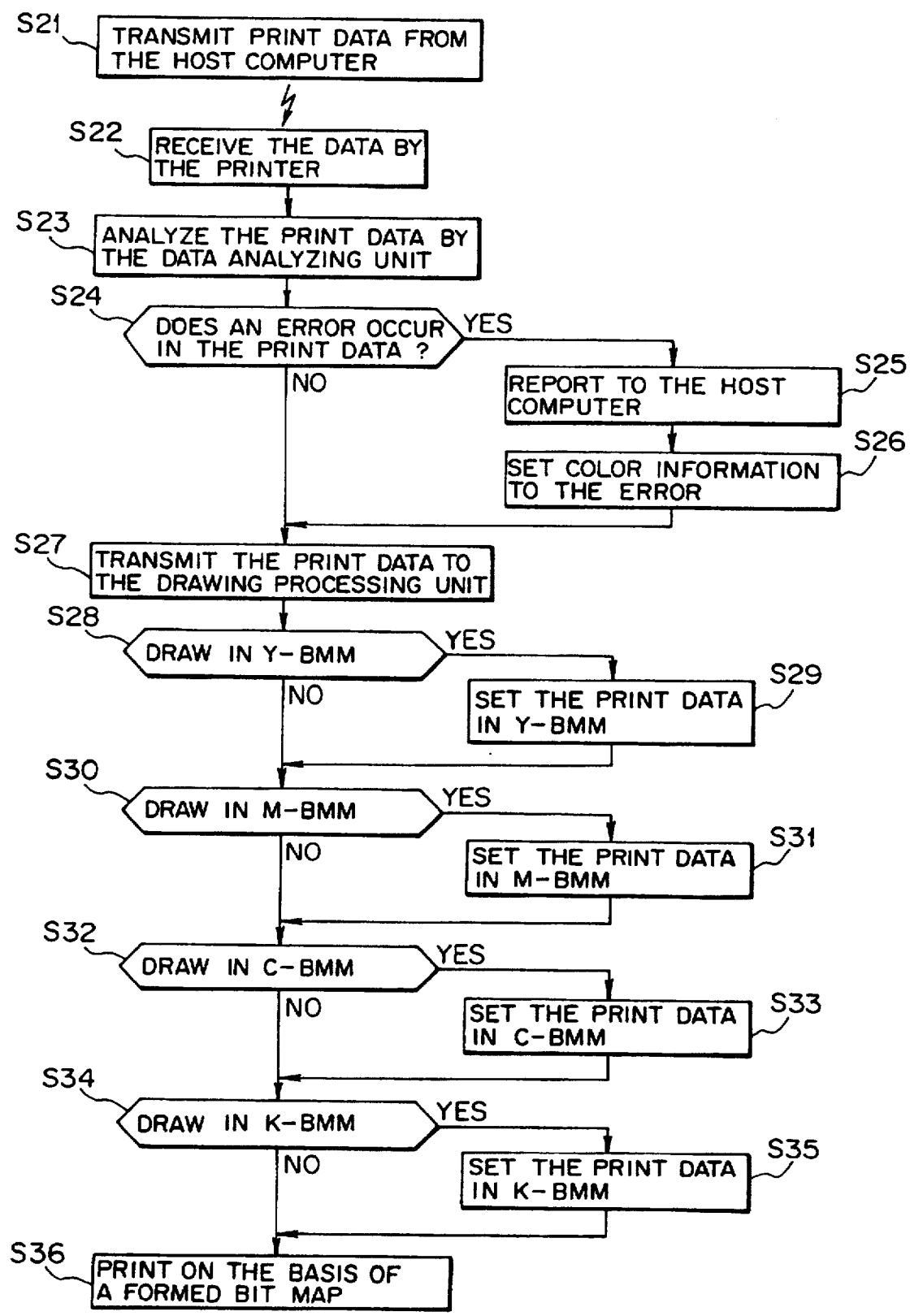
FIG. 29 is a flowchart for illustrating in detail an operation of the printing apparatus according to the embodiment in the event of occurrence of a data error.

As will be described in detail later with reference to FIG. 29, the control unit 31 refers to coloring information set in the storage 31a from the host computer 20 or the operator panel 18 or coloring information read out from the backup RAM 31f and stored in the storage 31a, makes a bit map of a page in which the data error has occurred in the bit map memory 31d in order to implement a color printing in a designated color and in a designated position, and instructs the color printing engine 11 to implement the color printing.

The data error occurring page printed as above is discharged to the stacker 17 as indicated at 2 of FIG. 27.

Figure 28:
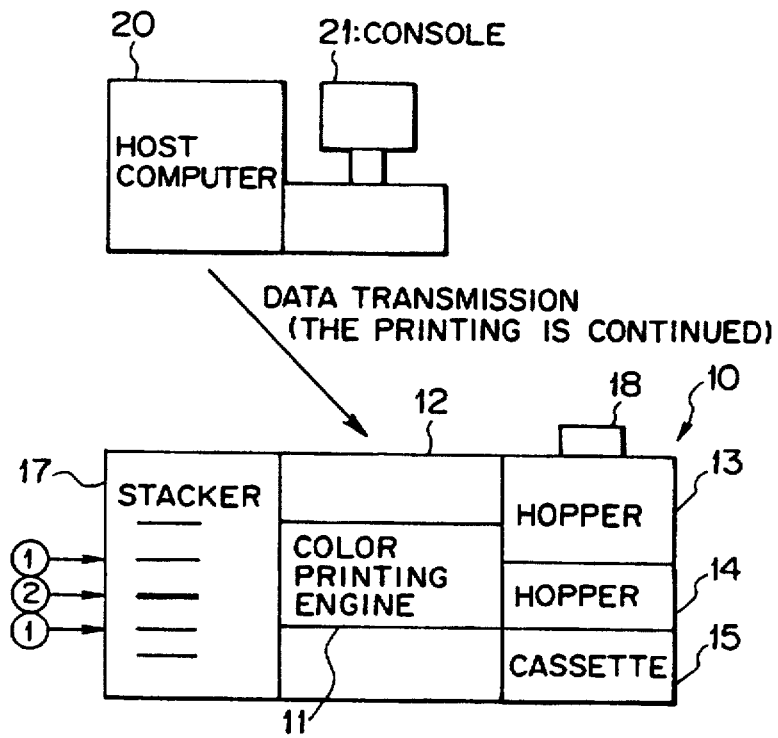
FIG. 28 is a diagram for illustrating a basic operation of the printing apparatus according to the embodiment in the event of occurrence of a data error.

After that, the printing apparatus 10 continuously performs the job printing while receiving print data from the host computer 20 as shown in FIG. 28, and normally printed papers (refer to 1 in the drawing) are successively discharged onto the data error occurring page in the stacker 17.

If a coloring position is arbitrary set as described hereinbefore with reference to FIG. 10(a), a coloring position for the data error occurring page 40 is selected from patterns shown in, for example, FIGS. 15(a) through 15(c) so that the operator can easily confirm the data error occurring page 40 even in a state where the data error occurring page 40 is sandwiched between another printed output papers. If a coloring position is automatically set as described hereinbefore with reference to FIG. 10(b), the color is applied in positions shown in FIG. 16 so that the operator can easily discriminate the data error occurring page from another printed output papers while occurrence of a jam can be surely suppressed.

If a part in which a data error has occurred is selected as a coloring position upon arbitrarily setting a coloring position as described hereinbefore with reference to FIG. 10(a), a part in which the data error in connection with "Unprintable Character 1", "Unprintable Character 2" and "Multiple Characters" has occurred is applied a color as shown in FIG. 18, or an entire width on a side where data overflows is applied a color in the case of a data error of "Data Lost Error" stated above, as shown in FIG. 19.

Whereby, the operator can easily judge in which position on the data error occurring page a data miss has occurred, besides easily judging a direction in which data overflows from the paper in the case of "Data Lost Error" (how a data lost error has occurred).

Next, an operation of the printing apparatus 10 of this embodiment will be described with reference to a flowchart (Steps S21 through S36) shown in FIG. 29.

Print data is transmitted from the host computer 20 (Step S21). When the printing apparatus 10 receives the print data (Step S22), the printing apparatus 10 first analyzes the received print data by the data analyzing unit 31b (Step S23).

It is then judged on the basis of data analysis whether an error has occurred in the print data or not (Step S24). This judgement is implemented by, for example, the detecting unit 31e receiving a data error occurrence signal from the data analysing unit 31b, as stated above. If no error has occurred (in the case of NO judgement at Step S24), the procedure proceeds to Step S27 and a normal printing operation is implemented. On the other hand, if an error has occurred (in the case of YES judgement at Step S24), this effect is reported to the host computer 20 (Step S25), and the storage 31a or the backup RAM 31f is referred to for setting coloring information (a color, a position) for the error, at the same time (Step S26).

In either the case of a normal printing or a color printing following occurrence of a data error, information about the print data is transmitted to the drawing processing unit 31c (Step S27). After that, the drawing processing unit 31c draws a bit map in each of the colors (Y, M, C and K) in the bit map memory 31d(Steps S28 through S35). On the basis of the bit map drawn and formed in the bit map memory 31d, the color printing engine 11 implements a printing (Step S36).

In a process at Steps S28 through S35 by the drawing processing unit 31c, it is first judged whether or not the drawing is to be done in a region for yellow (Y) in the bit map memory 31d (Step S28). If the drawing is to be done, print data is set in that region (Step S29). The similar process is conducted in each of regions for magenta (M; Steps S30 and S31), cyan (C; Steps S32 and S33), and black (K; Steps S34 and S35).

More practical example (in the case where "Unprintable Character 1" has occurred as a data error) will be now described.

Assuming here that from the host computer 20 a request for drawing a character code X "4040 B0A1 FFFF" in yellow using a write command is transmitted to the printing apparatus 10. Incidentally, in the above character code, "4040" designates a blank, "B0A1" designates a Chinese character "愛", and "FFFF" is an undefined part. It is also assumed here that a mode of applying a blue color on a part in which a data error has occurred is set in advance when a coloring is implemented in the event of occurrence of a data error.

When the printing apparatus 10 receives the above character code, the data analyzing unit 31b analyzes the print data, and requests the drawing processing unit 31c to print X "4040"=blank, and X "B0A1"="愛". On the other hand, since X "FFFF" is an undefined part, the data error "Unprintable Character 1" is detected so that the data analyzing unit 31b requests the drawing processing unit 31c to print a blank character to which color information (blue) at the time of occurrence of a data error is set in that printed part.

The drawing processing unit 31c draws a bit map in each of the colors of Y, M, C and K in the bit map memory 31d according to the request for printing as described above with reference to FIG. 29, and a result of the drawing is printed on a data error occurring page by the color printing engine 11.

In consequence, X "4040" is printed as a blank, X "B0A1" is printed as a Chinese character "愛", and X "FFFF" is printed as a blank in blue.

As above, a color printing is implemented on the data error occurring page 40 taking occurrence of a data error as an opportunity, whereby the operator can readily discriminate the page 40 from another printed output papers. This makes it possible to largely reduce a burden on the operator when the operator confirms the data error occurring page 40 and largely improve reliability of results of printed outputs.

Coloring on a part in which a data error has occurred permits the operator to immediately judge a position in which the data error has occurred and a condition of the occurrence of the data error only by referring to the data error occurring page 40 so that it is possible to largely improve an efficiency of correcting a job.

Further, coloring information necessary for a color printing is stored in the backup RAM 31f so that the operator can conduct a color printing on the data error occurring page 40 as same as the last time only by referring to the information in the backup RAM 31f without necessity of re-setting the coloring information when the power supply is thrown in again. As this, there is no need of re-setting the coloring information on every occasions, which little causes a burden on the operator.

(b2) A coloring operation in the event of a job cancel instruction (in the event of occurrence of an incomplete paper)

An operation of the printing apparatus 10 of this embodiment in the event of receipt of a job cancel instruction will be described with reference to FIGS. 30 through 33. First, a basic operation of the printing apparatus 10 in the event of job cancelling will be described with reference to a flowchart (Steps S41 through S46) shown in FIG. 30.

Figure 30:
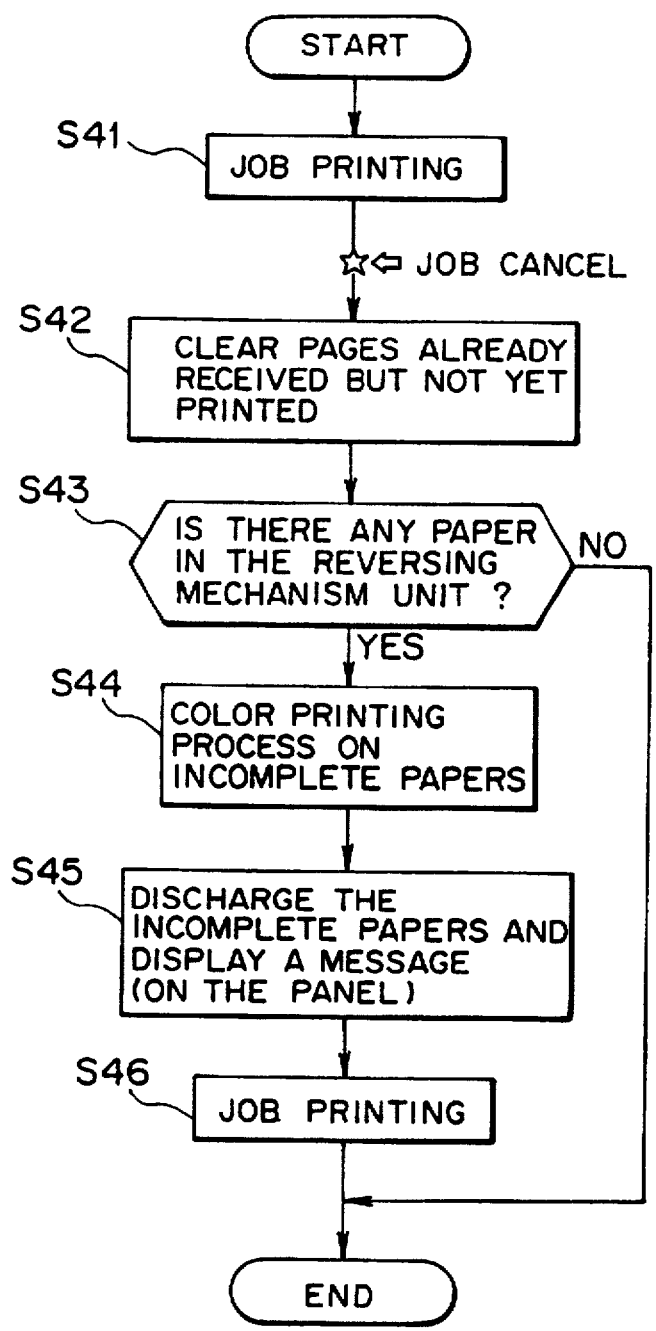
FIG. 30 is a flowchart for illustrating a basic operation of the printing apparatus according to the embodiment in the case where a job is cancelled.

As shown in FIG. 30, when receiving print data from the host computer 20, the printing apparatus 10 implements a job printing (Step S41). If the detecting unit 31e detects that the printing apparatus 10 receives a job cancel command from the host computer 20 or the operator panel 18 during the job printing, data of pages already received but not yet printed that is an object of the job cancelling on the storage 31a is cleared (Step S42), then the control unit 31 judges whether or not there remains paper only one side of which has been printed on (an incomplete paper that should be a check objective paper) in the reversing mechanism unit 12 (Step S43).

In the reversing mechanism unit 12, plural papers only one sides of which have been printed on are temporarily stored, turned over, and fed to the color printing engine 11 to be printed on the other sides. If a job is cancelled when a double-side printing is performed as a job with the reversing mechanism unit 12 as above, plural incomplete papers only one sides of which have been printed on might remain in the reversing mechanism unit 12.

If there remains no incomplete paper (in the case of NO judgement at Step S43), the procedure proceeds to Step S46 to implement the next job printing. If there remains any incomplete paper (in the case of YES judgement at Step S43), a color printing is implemented on every incomplete paper that should be a check objective paper according to coloring information (a color, a position) designated in advance as stated hereinbefore (Step S44).

In other words, the control unit 31 refers to coloring information set in the storage 31a from the host computer 20 or the operator panel 18 or coloring information read out from the backup RAM 31f and stored in the storage 31a, draws a bit map for the incomplete papers in the bit map storage 31d in order to implement the color printing in a designated color and in a designated position, and instructs the color printing engine 11 to implement the printing.

Figure 31:
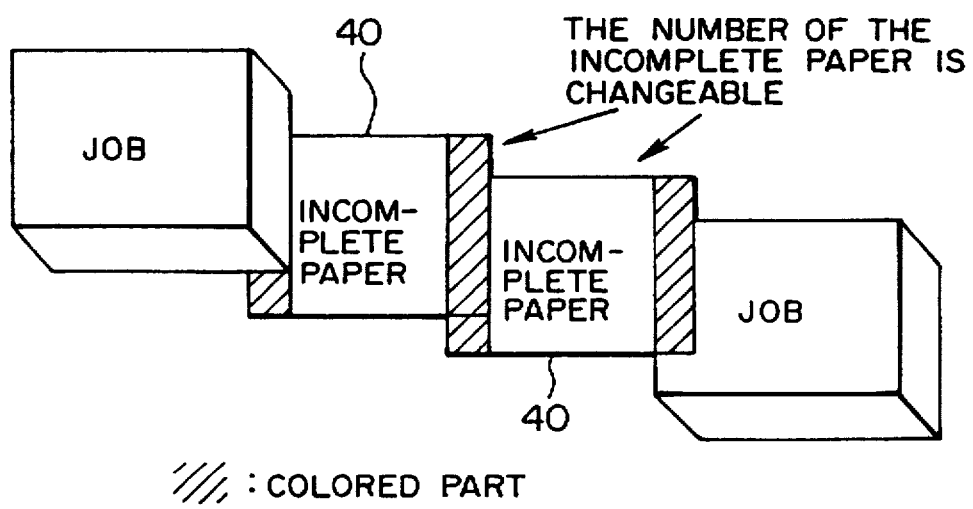
FIG. 31 shows a condition of printed outputs of incomplete papers according to the embodiment.

As above, the incomplete papers 40 which have been colored in the designated color and in the designated position are printed and outputted in a state where the incomplete papers 40 are sandwiched between papers normally printed and outputted, as shown in FIG. 31. FIG. 31 shows a case where the right and left positions have been selected.

The control unit 31 displays an effect that the incomplete papers have been discharged on the operator panel 18 (the message display unit 18D) of the printing apparatus 10 (Step S45), then the procedure proceeds to implement the next job printing (Step S46).

Figure 32:
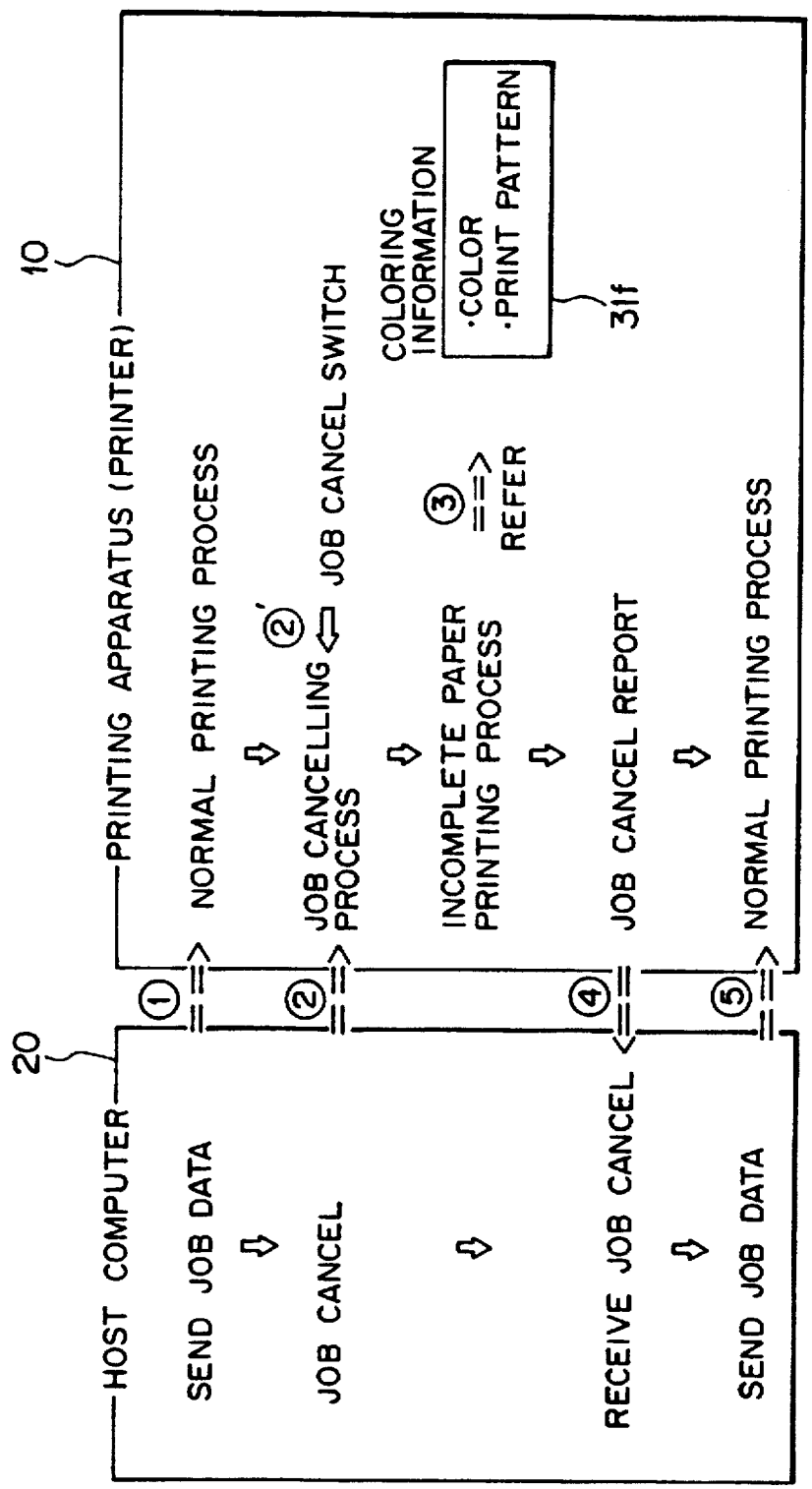
FIG. 32 is a diagram for illustrating an operation of the printing apparatus according to the embodiment in the case where a job is cancelled.

Referring now to FIG. 32, an operation of the printing apparatus 10 of this embodiment described above with reference to FIG. 30 will be described while grasping exchanges of information between the host computer 20 and the printing apparatus 10.

When job data (print data) is sent out from the host computer 20 (refer to ① in FIG. 32), the printing apparatus 10 conducts a normal printing process. If the operator issues a job cancel command by operating a switch (not shown) on the main console 21 of the host computer 20 or the job cancel switch 18d of the printing apparatus 10 (refer to ② or ②' in FIG. 32), the printing apparatus 10 proceeds to an incomplete paper printing process. This incomplete paper printing process is similar to the process at Steps S42 through S45 in FIG. 31. When a color printing process is implemented on incomplete papers, coloring information stored in the backup RAM 31f is referred as stated above (refer to ③ in FIG. 32).

When the incomplete paper printing process is over, the printing apparatus 10 makes a job cancel report to the host computer 20 (refer to ④ in FIG. 32). The host computer 20 receiving this report sends out the next job data (print data)

(refer to ⑤ in FIG. 32), the printing apparatus 10 thereby implements the next normal printing process.

Figure 33:
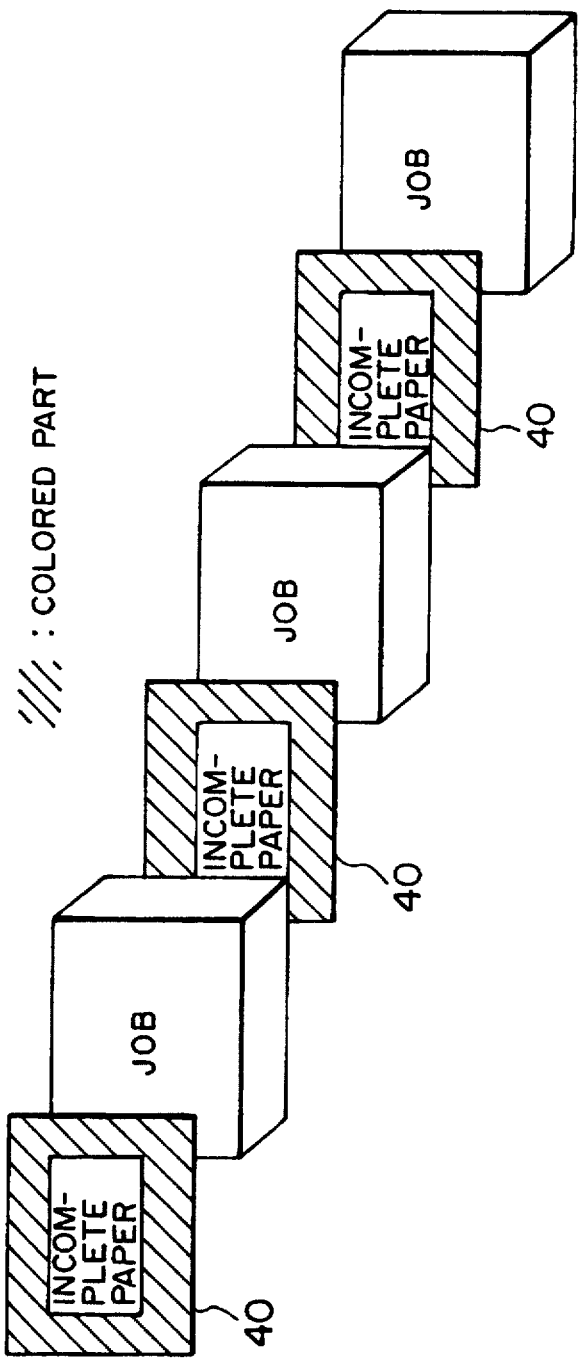
FIG. 33 shows a condition of printed outputs of incomplete papers according to the embodiment.

If a coloring position is arbitrarily set as described hereinbefore with reference to FIG. 12(a), a coloring position on the incomplete papers 40 is selected from patterns shown in, for example, FIGS. 15(a) through 15(c) so that the operator can easily confirm the incomplete papers 40 even under a condition where the incomplete papers 40 are sandwiched between another printed output papers. For instance, FIG. 31 shows a condition of outputs of papers in the case where the right and left positions are designated as coloring positions, whereas FIG. 33 shows a condition of outputs of papers in the case where an entire periphery is designated as a coloring position. If a coloring position is automatically set as described hereinbefore with reference to FIG. 12(b), a color is applied in positions shown in FIG. 16 so that the operator can easily discriminate the incomplete papers 40 from another printed output papers besides an occurrence of a jam can be surely suppressed.

A color printing is implemented on the incomplete papers 40 taking an issue of a job cancel command as an opportunity as above so that the operator can easily discriminate the paper 40 from another printed output papers. This is effective to largely reduce a burden on the operator when the operator confirms the incomplete papers 40 and to largely improve an assurance of results of printed outputs.

Coloring information necessary for a color printing is stored in the backup RAM 31f so that the operator can conduct a color printing on incomplete papers 40 as same as before only by referring information in the backup RAM 31f without necessity of re-setting the coloring information when the power supply is thrown in again. This can reduce a burden on the operator since there is no need for re-setting coloring information on every occasion.

(b3) A coloring operation in the event of occurrence of a jam (in the event of an output of a jam message)

An operation of the printing apparatus 10 of this embodiment in the event of occurrence of a jam will be next described with reference to FIGS. 34 through 38. First, a basic operation of the printing apparatus 10 in the event of occurrence of a jam will be first described with reference to a flowchart (Steps S51 through S54) shown in FIG. 34.

Figure 34:
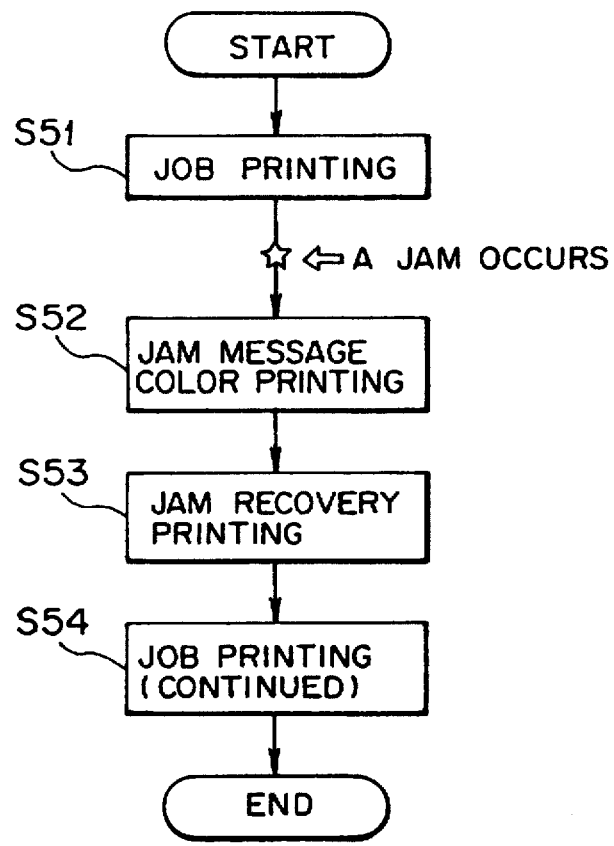
FIG. 34 is a flowchart for illustrating a basic operation of the printing apparatus according to the embodiment in the event of occurrence of a jam.

As shown in FIG. 34, when receiving print data from the host computer 20, the printing apparatus 10 initiates a job printing (Step S51). If the paper detecting sensor 32 and the detecting unit 31e detect occurrence of a jam inside the printing apparatus 10 during the job printing, the operator takes measures to the jam to remove the jam. After that, a jam message showing that the jam has been occurred is printed out, and a color printing is simultaneously implemented on the jam message printed paper (a check objective paper) according to coloring information (a color, a position) designated in advance as stated hereinbefore (Step S52).

In other words, the control unit 31 refers coloring information set in the storage 31a from the host computer 20 or the operator panel 18 or coloring information read out from the backup RAM 31f and stored in the storage 31a, draws a bit map for the jam message printed paper in the bit map memory 31d in order to implement a color printing in a designated color and in a designated position, and instructs the color printing engine 11 to print.

A jam recovery printing is implemented on a page in which the jam has occurred (Step S53), after that, the job printing is continued (Step S54).

Figure 35:
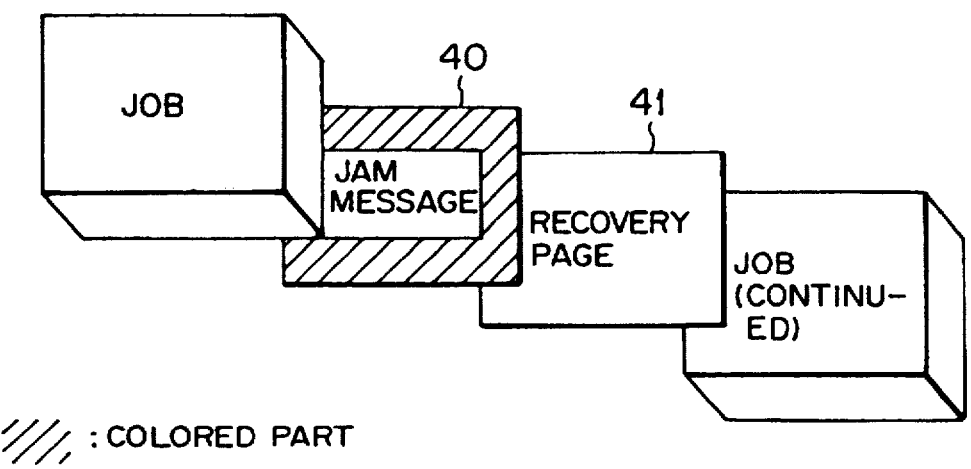
FIG. 35 shows a state of a printed output of a jam message printed paper according to the embodiment.

As above, the jam message printed paper 40 printed in a designated color and in a designated position (FIG. 31 shows a case where the left and right positions are selected) and the recovery page 41 are printed and outputted in a state where the jam message printed paper 40 and the recovery page 41 are sandwiched between papers normally printed and outputted, as shown in FIG. 35.

Here, an operation of the printing apparatus 10 of this embodiment will be described with reference to FIGS. 36 and 37 while grasping exchanges of information between the host computer 20 and the printing apparatus 10.

There is generally no information such as "an instruction to print a jam message" in data send from the host computer 20. For this, it is impossible for the printing apparatus 10 to judge whether a paper that should be printed next is a paper on which a jam message should be printed or not. FIG. 36 shows an example where an interface for receiving jam message information that is "an instruction to print a jam message" when the jam message from the host computer 20 is printed is provided in the printing apparatus 10 and a color printing is implemented taking a receipt of the information as an opportunity.

When job data (print data) is sent out from the host computer 20 (refer to ① in FIG. 36), the printing apparatus 10 conducts a normal printing process. If a jam has occurred during the normal printing process, the printing apparatus 10 makes a jam report to the host computer 20 (refer to ② in FIG. 36).

Figure 36:
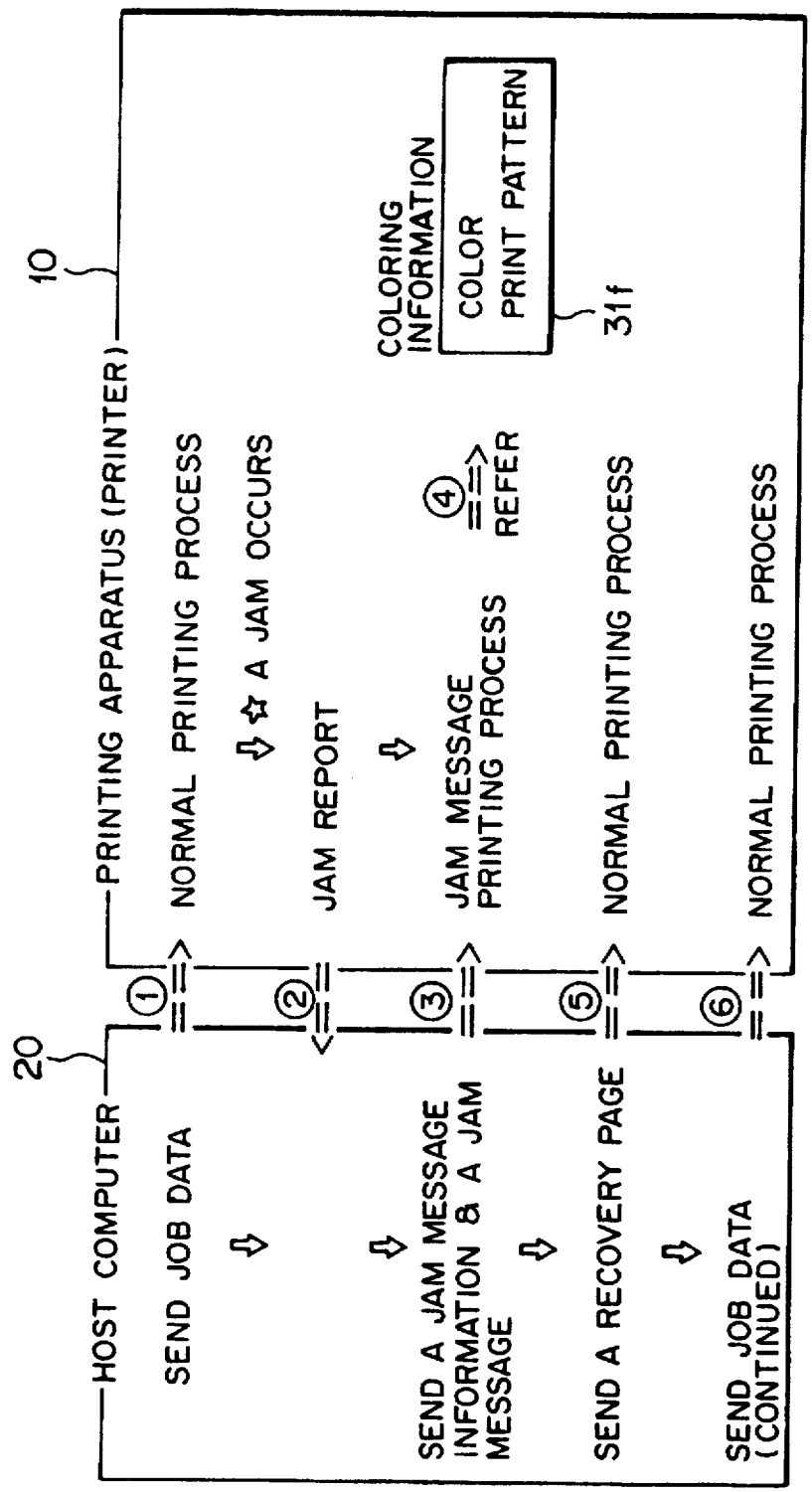
FIG. 36 is a diagram for illustrating an operation of the printing apparatus according to the embodiment in the event of occurrence of a jam.
Figure 37:
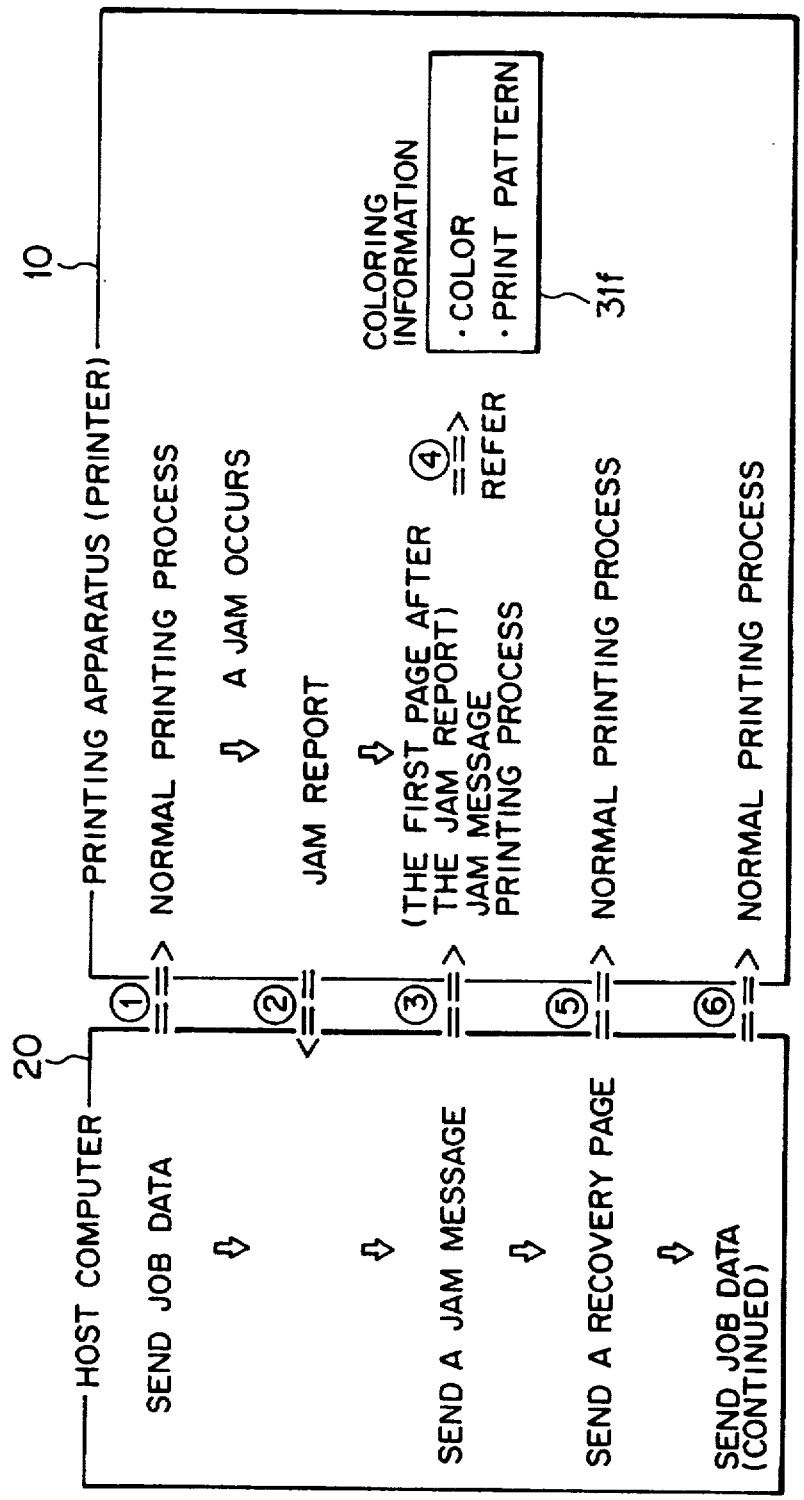
FIG. 37 is a diagram for illustrating an operation of the printing apparatus according to the embodiment in the event of occurrence of a jam.

The host computer 20 receiving the jam report sends a jam message that should be printed along with the jam message information mentioned above to the printing apparatus 10 (refer to ③ in FIG. 36). The printing apparatus 10 proceeds to a jam message printing process taking a receipt of the jam message information as an opportunity. This jam message printing process is as having been described as the process at Step S52 in FIG. 34. When a color printing process is implemented on a jam message printed paper, coloring information stored in the backup RAM 31f is referred to as stated above (refer to ④ in FIG. 36).

When the jam message printing process is over, the printing apparatus 10 conducts a normal printing process on a recovery page (refer to ⑤ in FIG. 36) transmitted from the host computer 20 to implement a jam recovery printing corresponding to Step S53 in FIG. 34, after that, continuously receives job data from the host computer 20 (refer to ⑥ in FIG. 36) to continue the normal printing process.

When occurrence of a jam is detected in the printing apparatus 10, it is obvious that a page sent next from the host computer 20 is a jam message. In consequence, it is possible to implement a color printing on a jam message printed paper without providing an interface for receiving jam message information that is "an instruction to print a jam message" from the host computer 20 by implementing a color printing taking a detection of occurrence of a jam inside the printing apparatus 10 as an opportunity. An example of this is shown in FIG. 37.

When job data (print data) is sent out from the host computer 20 (refer to ① in FIG. 37), the printing apparatus 10 conducts a normal printing process. If a jam has occurred during the normal printing process, the printing apparatus 10 makes a jam report to the host computer 20 (refer to ② in FIG. 37), and proceeds to a jam message printing process at the same time.

When the printing apparatus 10 receives a jam message from the host computer 20 (refer to ③ in FIG. 37), the printing apparatus 10 implements a color printing process besides printing a jam message on the first page after the jam report to the host computer 20. This process is similar to the process at Step S52 in FIG. 34. At this time, coloring information stored in the backup RAM 31f is referred when the color printing process is implemented on the jam message printed paper as same as stated above (refer to ④ in FIG. 37).

When the jam message printing process is over, the printing apparatus 10 conducts a normal printing process for a recovery page (refer to ⑤ in FIG. 37) transmitted from the host computer 20 quite similarly to the example shown in FIG. 36 to implement a jam recovery printing corresponding to Step S53 in FIG. 34, after that, continuously receives job data from the host computer 20 (refer to ⑥ in FIG. 37) to continue the normal printing process.

Figure 38:
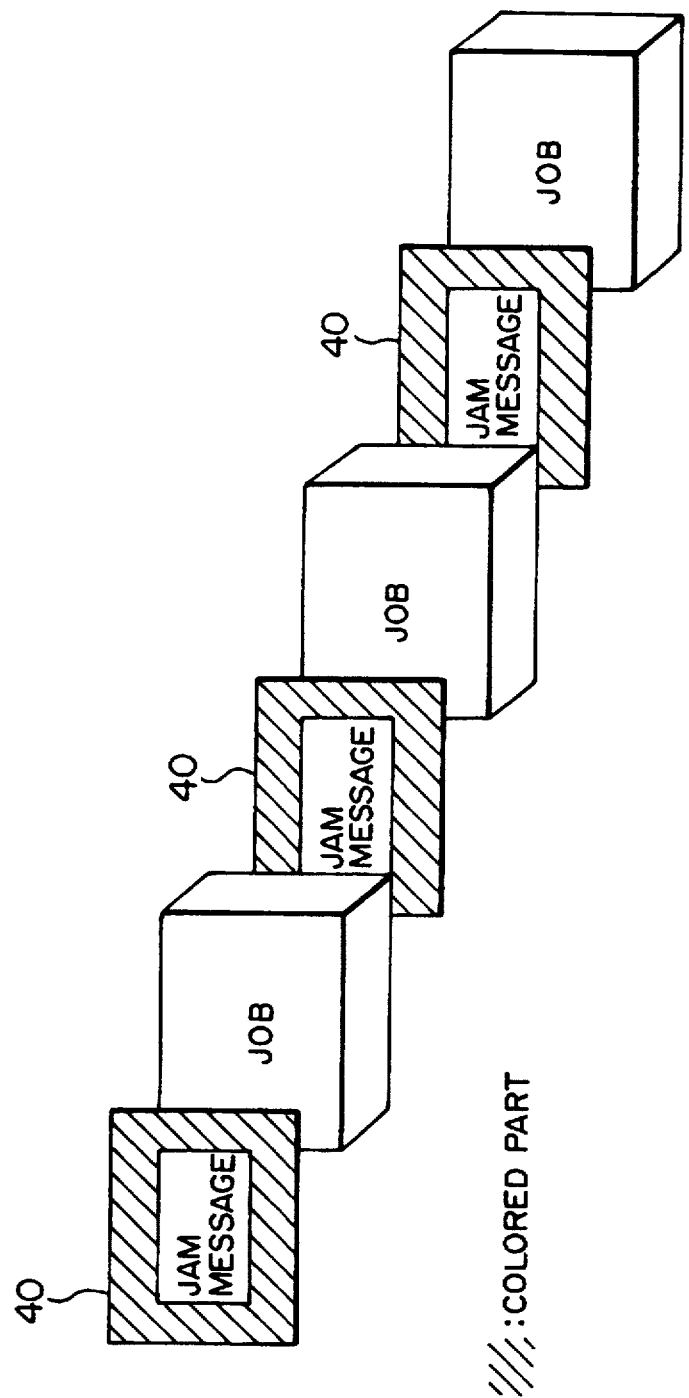
FIG. 38 shows a state of printed outputs of jam message printed papers according to the embodiment.

If a coloring position is arbitrarily set as described hereinbefore with reference to FIG. 14(a), a coloring position on the jam message printed paper is selected from patterns shown in, for example, FIGS. 15(a) through 15(c) so that the operator can easily confirm the jam message printed paper 40 even under a state where the jam message printed paper 40 is sandwiched between another printed output papers. For instance, FIG. 35 shows a state of an output of the paper in the case where the left and right positions are designated as the coloring positions, whereas FIG. 38 shows a state of an output of the paper in the case where an entire peripheral position is designated as the coloring position. If the coloring position is automatically set as described hereinbefore with reference to FIG. 14(b), a color printing is implemented in a position shown in FIG. 16 so that the operator can easily discriminate the jam message printed paper 40 from another printed output papers while occurrence of a jam can be surely suppressed.

As above, the color printing is implemented on the jam message printed paper 40 taking an occurrence of a jam as an opportunity, the operator can thereby easily confirm a presence of the jam message printed paper 40 and a position of the jam (that is, a presence of occurrence of a jam and a position in which the jam has occurred). For this, it is possible to largely reduce a burden on the operator when the operator confirms a position in which the jam has occurred and check certainly as to whether there is any missing page due to the occurrence of the jam.

Coloring information necessary for a color printing is stored in the backup RAM 31f, the operator can thereby conduct a color printing on incomplete papers as same as before without necessity of re-setting the coloring information only by referring to the information stored in the backup RAM 31f when the power supply is thrown in again. It is therefore unnecessary to re-set the coloring information on every occasion, which causes little burden on the operator.

As having been described the above embodiment by way of an example where the printing apparatus 10 is provided with the color printing engine 11 so as to designate a color as color information for the check objective paper 40. This invention is not limited to the above example, but applicable to a case where the printing apparatus 10 is provided with a monochromatic printing engine. In this case, if a printing color is black, a color printing is implemented in positions shown in FIGS. 15(a), 15(b), 15(c), 16, 18 and 19 although the printing in only black is feasible, whereby the operator can easily confirm a check objective paper. This can also bring the same feature and effect as the above embodiment.

What is claimed is:

1. A printing apparatus, comprising:
   a printing mechanism for implementing printing in at least one printing color on a predetermined paper;
   a control unit for controlling a printing operation of said printing mechanism; and
   a detecting unit for detecting an opportunity of printing and outputting a check objective paper that should be an object of confirmation by an operator during a printing operation of said printing mechanism,
   wherein when said detecting unit detects said opportunity, said control unit controls said printing mechanism in order to implement a color printing on said check objective paper in order to discriminate said check objective paper from another printed output paper, and
   wherein said control unit receives color information for said check objective paper, said color information including color designating information and a position designating information.

2. The printing apparatus according to claim 1, wherein said check objective paper is a paper on which a data error in print data transmitted from an upper apparatus has occurred, and said detecting unit detects occurrence of said data error as said opportunity.

3. The printing apparatus according to claim 1, wherein said check objective paper is an incomplete paper outputted following an interruption of printing according to a job cancel instruction, said detecting unit detects said job cancel instruction as said opportunity.

4. The printing apparatus according to claim 1, wherein said check objective paper is a jam message printed paper printed and outputted after removal of a jam, said detecting unit detects a receipt of jam message information from an upper apparatus as said opportunity.

5. The printing apparatus according to claim 1, wherein said check objective paper is a jam message printed paper printed and outputted after removal of a jam, and said detecting unit detects a jam detection as said opportunity.

6. The printing apparatus according to claim 2, wherein said color printing is implemented in a position on said check objective paper where said data error has occurred.

7. The printing apparatus according to claim 1, wherein if said printing mechanism has a multi-color printing function, the printing apparatus further comprises a color designating unit for designating a color printed in said color printing.

8. The printing apparatus according to claim 1, wherein if said printing mechanism has a multi-color printing function, a color printed in said color printing is designated according to an instruction from an upper apparatus.

9. The printing apparatus according to claim 1 further comprising a position designating unit for designating a position on said check objective paper in which said color printing is implemented.

10. The printing apparatus according to claim 7 further comprising a position designating unit for designating a position on said check objective paper in which said color printing is implemented.

11. The printing apparatus according to claim 8 further comprising a position designating unit for designating a position on said check objective paper in which said color printing is implemented.

12. The printing apparatus according to claim 1, wherein a position on said check objective paper in which said color printing is implemented is designated according to an instruction from an upper apparatus.

13. The printing apparatus according to claim 7, wherein a position on said check objective paper in which said color printing is implemented is designated according to an instruction from an upper apparatus.

14. The printing apparatus according to claim 8, wherein a position on said check objective paper in which said color printing is implemented is designated according to an instruction from an upper apparatus.

15. The printing apparatus according to claim 1, wherein a position hardly causing a jam is designated in advance as a position on said check objective paper in which said color printing is implemented.

16. The printing apparatus according to claim 7, wherein a position hardly causing a jam is designated in advance as a position on said check objective paper in which said color printing is implemented.

17. The printing apparatus according to claim 8, wherein a position hardly causing a jam is designated in advance as a position on said check objective paper in which said color printing is implemented.

18. The printing apparatus according to claim 1 further comprising a nonvolatile storage unit for storing coloring information necessary for implementing said color printing.

19. The printing apparatus according to claim 2 further comprising a nonvolatile storage unit for storing coloring information necessary for implementing said color printing.

20. The printing apparatus according to claim 3 further comprising a nonvolatile storage unit for storing coloring information necessary for implementing said color printing.

21. The printing apparatus according to claim 4 further comprising a nonvolatile storage unit for storing coloring information necessary for implementing said color printing.

22. The printing apparatus according to claim 5 further comprising a nonvolatile storage unit for storing coloring information necessary for implementing said color printing.

23. The printing apparatus according to claim 6 further comprising a nonvolatile storage unit for storing coloring information necessary for implementing said color printing.

24. The printing apparatus according to claim 7 further comprising a nonvolatile storage unit for storing coloring information necessary for implementing said color printing.

25. The printing apparatus according to claim 8 further comprising a nonvolatile storage unit for storing coloring information necessary for implementing said color printing.

26. The printing apparatus according to claim 9 further comprising a nonvolatile storage unit for storing coloring information necessary for implementing said color printing.

27. The printing apparatus according to claim 10 further comprising a nonvolatile storage unit for storing coloring information necessary for implementing said color printing.

28. The printing apparatus according to claim 11 further comprising a nonvolatile storage unit for storing coloring information necessary for implementing said color printing.

29. The printing apparatus according to claim 12 further comprising a nonvolatile storage unit for storing coloring information necessary for implementing said color printing.

30. The printing apparatus according to claim 13 further comprising a nonvolatile storage unit for storing coloring information necessary for implementing said color printing.

31. The printing apparatus according to claim 14 further comprising a nonvolatile storage unit for storing coloring information necessary for implementing said color printing.

32. The printing apparatus according to claim 15 further comprising a nonvolatile storage unit for storing coloring information necessary for implementing said color printing.

33. The printing apparatus according to claim 16 further comprising a nonvolatile storage unit for storing coloring information necessary for implementing said color printing.

34. The printing apparatus according to claim 17 further comprising a nonvolatile storage unit for storing coloring information necessary for implementing said color printing.

* * * * *